United States Patent
Hisano

(10) Patent No.: US 11,294,506 B2
(45) Date of Patent: Apr. 5, 2022

(54) POSITION DETECTION SYSTEM AND TOUCH SENSOR

(71) Applicant: Wacom Co., Ltd., Saitama (JP)

(72) Inventor: Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/861,011

(22) Filed: Apr. 28, 2020

(65) Prior Publication Data
US 2020/0257429 A1    Aug. 13, 2020

Related U.S. Application Data

(63) Continuation of application No. PCT/JP2017/039580, filed on Nov. 1, 2017.

(51) Int. Cl.
*G06G 3/04* (2006.01)
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/0442* (2019.05); *G06F 3/04162* (2019.05)

(58) Field of Classification Search
CPC ............ G06F 3/03545; G06F 3/04182; G06F 3/0442; G06F 3/04162; G06F 3/0412
See application file for complete search history.

(56) References Cited

U.S. PATENT DOCUMENTS

| 2011/0069036 | A1* | 3/2011 | Anno | G06F 3/03545 |
| 2014/0168137 | A1* | 6/2014 | Pyo | G06F 3/0443 345/174 |
| 2016/0239123 | A1* | 8/2016 | Ye | G06F 3/03545 |
| 2017/0308185 | A1* | 10/2017 | Eguchi | G01D 5/2046 |
| 2018/0188832 | A1* | 7/2018 | Coppin | G06F 3/0446 |

FOREIGN PATENT DOCUMENTS

| JP | 2013-114247 A | | 6/2013 | |
| JP | 2013114247 | * | 6/2013 | ............ G06F 3/041 |
| JP | 6081696 B2 | | 2/2017 | |
| JP | 6082172 B1 | | 2/2017 | |
| WO | 2015/137053 A1 | | 9/2015 | |
| WO | WO2015137053 | * | 9/2015 | ......... G06F 3/03545 |
| WO | 2016/088488 A1 | | 6/2016 | |

OTHER PUBLICATIONS

International Search Report, dated Jan. 23, 2018, for International Application No. PCT/JP2017/039580, 2 pages.

* cited by examiner

*Primary Examiner* — Roy P Rabindranath
(74) *Attorney, Agent, or Firm* — Seed IP Law Group LLP

(57) ABSTRACT

A position detection system detects a position of an active pen. The position detection system includes: a display device that displays image data by driving each of a plurality of pixel electrodes; and a touch panel including a sensor electrode and a touch sensor. The active pen communicates with the touch sensor using a frequency included in a predetermined frequency band by a charge induced in the sensor electrode. The display device suppresses at least one frequency component included in the predetermined frequency band in capacitive noise that occurs in the sensor electrode due a voltage vibration in an interconnect in the display device caused by driving of the plurality of pixel electrodes. The active pen and the touch sensor communicate by detecting or sending out a signal with a predetermined frequency included in the predetermined frequency band.

24 Claims, 27 Drawing Sheets

FIG.11A

| | S1 | S2 | S3 | S4 | S5 | S6 | S7 | S8 | S9 | S10 | S11 | S12 | VARYING POTENTIAL DIFFERENCE | LIGHTING QUANTITY DIFFERENCE |
|---|---|---|---|---|---|---|---|---|---|---|---|---|---|---|
| G1 | + | − | + | − | + | − | + | − | + | − | + | − | | 0 |
| G2 | + | − | + | − | + | − | + | − | + | − | + | − | 0 | 0 |
| G3 | + | − | + | − | + | − | + | − | + | − | + | − | 6 | 6 |

FIG.11B

| | S1 | S2 | S3 | S4 | S5 | S6 | S7 | S8 | S9 | S10 | S11 | S12 | VARYING POTENTIAL DIFFERENCE | LIGHTING QUANTITY DIFFERENCE |
|---|---|---|---|---|---|---|---|---|---|---|---|---|---|---|
| G1 | + | − | + | − | + | − | + | − | + | − | + | − | | 0 |
| G2 | + | − | + | − | + | − | + | − | + | − | + | − | 0 | 0 |
| G3 | + | − | + | + | − | − | + | − | + | + | − | − | 0 | 0 |
| G4 | + | − | + | − | + | − | + | − | + | − | + | − | 0 | 0 |
| G5 | + | − | + | − | + | − | + | − | + | − | + | − | 0 | 0 |
| G6 | + | − | + | − | + | − | + | − | + | − | + | − | −6 | −6 |

FIG.11C

| | S1 | S2 | S3 | S4 | S5 | S6 | S7 | S8 | S9 | S10 | S11 | S12 | VARYING POTENTIAL DIFFERENCE | LIGHTING QUANTITY DIFFERENCE |
|---|---|---|---|---|---|---|---|---|---|---|---|---|---|---|
| G1 | + | − | + | − | + | − | + | − | + | − | + | − | | 0 |
| G2 | + | − | + | − | + | − | + | − | + | − | + | − | 0 | 0 |
| G3 | + | − | − | + | + | − | − | + | + | − | − | + | 0 | 0 |
| G4 | + | − | + | − | + | − | + | − | + | − | + | − | 0 | 0 |
| G5 | + | − | + | − | + | − | + | − | + | − | + | − | 0 | 0 |
| G6 | + | − | − | + | + | − | − | + | + | − | − | + | 0 | 0 |
| G7 | + | − | + | − | + | − | + | − | + | − | + | − | −6 | −6 |

FIG.12

| | S1 | S2 | S3 | S4 | S5 | S6 | S7 | S8 | S9 | S10 | S11 | S12 | VARYING POTENTIAL DIFFERENCE | LIGHTING QUANTITY DIFFERENCE |
|---|---|---|---|---|---|---|---|---|---|---|---|---|---|---|
| G1 | + | − | + | − | + | − | + | − | + | − | + | − | 0 | 0 |
| G2 | + | − | + | − | + | − | + | − | + | − | + | − | 0 | 0 |
| G3 | + | − | − | + | + | − | − | + | + | − | − | + | 0 | 0 |
| G4 | + | − | + | − | + | − | + | − | + | − | + | − | 0 | 0 |
| G5 | + | − | + | − | + | − | + | − | + | − | + | − | 0 | 0 |
| G6 | + | − | − | + | + | − | − | + | + | − | − | + | 0 | 0 |
| G7 | + | − | + | − | + | − | + | − | + | − | + | − | 0 | 0 |
| G8 | + | − | + | − | + | − | + | − | + | − | + | − | 0 | 0 |

|  | S1 | S2 | S3 | S4 | S5 | S6 | S7 | S8 | S9 | S10 | S11 | S12 | VARYING POTENTIAL DIFFERENCE | LIGHTING QUANTITY DIFFERENCE |
|---|---|---|---|---|---|---|---|---|---|---|---|---|---|---|
| G1 | + | − | + | − | + | − | + | − | + | − | + | − | 0 | 0 |
| G2 | + | − | + | − | + | − | + | − | + | − | + | − | 0 | 0 |
| G3 | + | − | + | − | + | − | + | − | + | − | + | − | 0 | 0 |
| G4 | + | − | + | − | + | − | + | − | + | − | + | − | 0 | 0 |
| G5 | + | − | + | − | + | − | + | − | + | − | + | − | 0 | 0 |
| G6 | + | − | − | + | + | − | − | + | + | − | − | + | 0 | 0 |
| G7 | + | − | + | − | + | − | + | − | + | − | + | − | −6 | −6 |
| G8 | + | − | + | − | + | − | + | − | + | − | + | − | 0 | 0 |

FIG.16

| | INVERSION PATTERN |
|---|---|
| G1 | H1Dot |
| G2 | H1Dot |
| G3 | H1+2Dot |
| G4 | H1Dot |
| G5 | H1+2Dot |
| G6 | H1+2Dot |
| ⋮ | ⋮ |

| | POLARITY | | | |
|---|---|---|---|---|
| | SG1 | SG2 | SG3 | ... |
| G1 | BASIC | BASIC | BASIC | |
| G3 | BASIC | BASIC | INVERTED | |
| G5 | BASIC | BASIC | INVERTED | ... |
| G7 | BASIC | BASIC | BASIC | |
| G9 | BASIC | INVERTED | BASIC | |
| G11 | BASIC | INVERTED | INVERTED | |
| ⋮ | ⋮ | ⋮ | ⋮ | ⋮ |

POSITION DETECTION SYSTEM AND TOUCH SENSOR

BACKGROUND

Technical Field

The present disclosure relates to a position detection system and a touch sensor.

Background Art

Tablet terminals are terminals in which a touch panel configuring a position detection system is disposed over a display surface of a display device to allow execution of input by an object such as a finger or stylus over the display surface. As examples of the display device, liquid crystal display, organic EL display, electronic paper, and so forth are cited.

It is known that electromagnetic noise occurs in association with driving operation of pixel electrodes in the above-described display devices. Hereinafter, this noise will be referred to as "display noise." In the tablet terminal, a sensor electrode of the touch panel is disposed over the display surface of the display device and therefore the display noise affects operation of the touch panel. So, in order to avoid the influence of the display noise, position detection systems configured to be capable of operating in synchronization with display operation of a liquid crystal display device have been proposed (for example, refer to Japanese Patents No. 6082172 and No. 6081696).

Japanese Patent No. 6082172 discloses a sensor controller that detects the operation cycle of a liquid crystal display device and utilizes a period in which the display noise does not occur (hereinafter, referred to as "noise free period") and notifies the noise free period to a stylus periodically or every time the noise free period occurs. The stylus according to this technique is configured to send out a signal in the notified noise free period.

Japanese Patent No. 6081696 discloses the following technique. A timing controller and a touch panel controller synchronously operate and the timing controller suppresses the occurrence of variation in a common voltage in each horizontal period to shorten the occurrence period of the display noise of a liquid crystal display. In addition, the touch panel controller carries out driving of a touch panel and sensing in the noise free period. In Japanese Patent No. 6081696, the occurrence frequency of the display noise in the liquid crystal display is reduced by inverting the polarity of each source driver in units of gate line according to a displayed image.

BRIEF SUMMARY

By the way, in recent years, an active pen has been attracting attention as one of input devices for a tablet terminal. The active pen is a stylus compatible with an active capacitive system and is configured to be capable of transmitting and receiving signals with a touch sensor disposed in a touch panel through a sensor electrode. Hereinafter, a signal sent out from the touch sensor to the active pen through the sensor electrode will be referred to as "uplink signal" and a signal sent out from the active pen to the touch sensor through the sensor electrode will be referred to as "downlink signal."

Normally writing pressure data depicting the magnitude of the pressure applied to the pen tip of the active pen is included in the downlink signal. The writing pressure data is used for deciding the thickness and transparency of a drawing line on the table terminal side and therefore needs to be received in real time. For this reason, in the case of causing communication to be carried out only in the noise free period as in the techniques described in the above-described Japanese Patents No. 6082172 and No. 6081696, there arises the need to notify the noise free period from the touch sensor to the active pen without omission in order to efficiently carry out transmission and reception of the writing pressure data. This notification is implemented by sending out a short uplink signal at the beginning of the noise free period like an auxiliary uplink signal USsub described in FIG. 14 of patent document 1, for example.

However, though this uplink signal is a short signal, when the beginning of the noise free period is used exclusively for the sending of the uplink signal, the already-short time that can be used for sending of the downlink signal becomes shorter. As a result, real-time transmission of the writing pressure data becomes difficult and the quality of rendering processing based on data transmitted by the active pen deteriorates in some cases. Therefore, an improvement is required.

Furthermore, there occur events that the active pen erroneously recognizes the display noise generated outside the noise free period as the uplink signal and that the sensitivity of a sensor circuit disposed in the active pen lowers due to the display noise generated outside the noise free period. This results in the deterioration of the quality of rendering processing based on data transmitted by the active pen, such as failure in rendering due to malfunction of the active pen, in some cases. So, an improvement is required also regarding this point.

Therefore, one of objects of the present disclosure is to provide a position detection system that can avoid the deterioration of the quality of rendering processing based on data transmitted by an active pen due to the display noise.

A position detection system according to the present disclosure is a position detection system that carries out position detection of an active pen. The position detection system includes a display device that displays image data by driving each of a plurality of pixel electrodes and a touch panel including a sensor electrode and a touch sensor. The active pen communicates with the touch sensor using a frequency included in a predetermined frequency band by a charge induced in the sensor electrode. The display device, in operation, suppresses at least one frequency component included in the predetermined frequency band in capacitive noise that occurs in the sensor electrode due to a voltage vibration in an interconnect in the display device caused by driving of the plurality of pixel electrodes. The active pen and the touch sensor communicate by detecting or sending out a signal with a predetermined frequency included in the predetermined frequency band.

Furthermore, a touch sensor according to the present disclosure is connected to a sensor electrode and is used in the position detection system having the above-described configuration in a position detection system that carries out position detection of an active pen. The active pen communicates with the touch sensor using a frequency included in a predetermined frequency band by a charge induced in the sensor electrode. The display device, in operation, suppresses at least one frequency component included in the predetermined frequency band in capacitive noise that occurs in the sensor electrode due to a voltage vibration in an interconnect in the display device caused by driving of the plurality of pixel electrodes. The touch sensor includes a processor; and a memory storing instructions that, when executed by the processor, cause the touch sensor to communicate with the active pen by detecting or sending out a signal with a predetermined frequency included in the predetermined frequency band.

According to the present disclosure, at least the frequency component included in the frequency band used for communication between the active pen and the touch sensor is suppressed in the display noise. Therefore, it becomes possible to avoid the deterioration of the quality of rendering processing based on data transmitted by the active pen due to the display noise.

BRIEF DESCRIPTION OF THE DRAWINGS

FIGS. 11A, 11B, and 11C are diagrams explaining inversion pattern selection processing in a case of using the first example depicted in FIG. 10A;

FIG. 12 is a diagram explaining inversion pattern selection processing in a case of using the first example depicted in FIG. 10A;

FIGS. 13A, 13B, and 13C are diagrams explaining inversion pattern selection processing in a case of using the second example depicted in FIG. 10B;

FIG. 14 is a diagram explaining inversion pattern selection processing in a case of using the second example depicted in FIG. 10B;

FIG. 16 is a diagram depicting stored contents of an inversion function register according to the second embodiment of the present disclosure;

FIG. 18A is a diagram explaining a driving method of pixel electrodes based on the background art of the present disclosure;

FIG. 18B is a diagram explaining a driving method of the pixel electrode in a case of displaying the same image data as displayed in FIG. 18A based on a third embodiment of the present disclosure;

FIG. 23 is a diagram depicting stored contents of the inversion function register according to a fourth embodiment of the present disclosure;

DETAILED DESCRIPTION

Embodiments of the present disclosure will be described in detail below with reference to the accompanying drawings.

Figure 1:
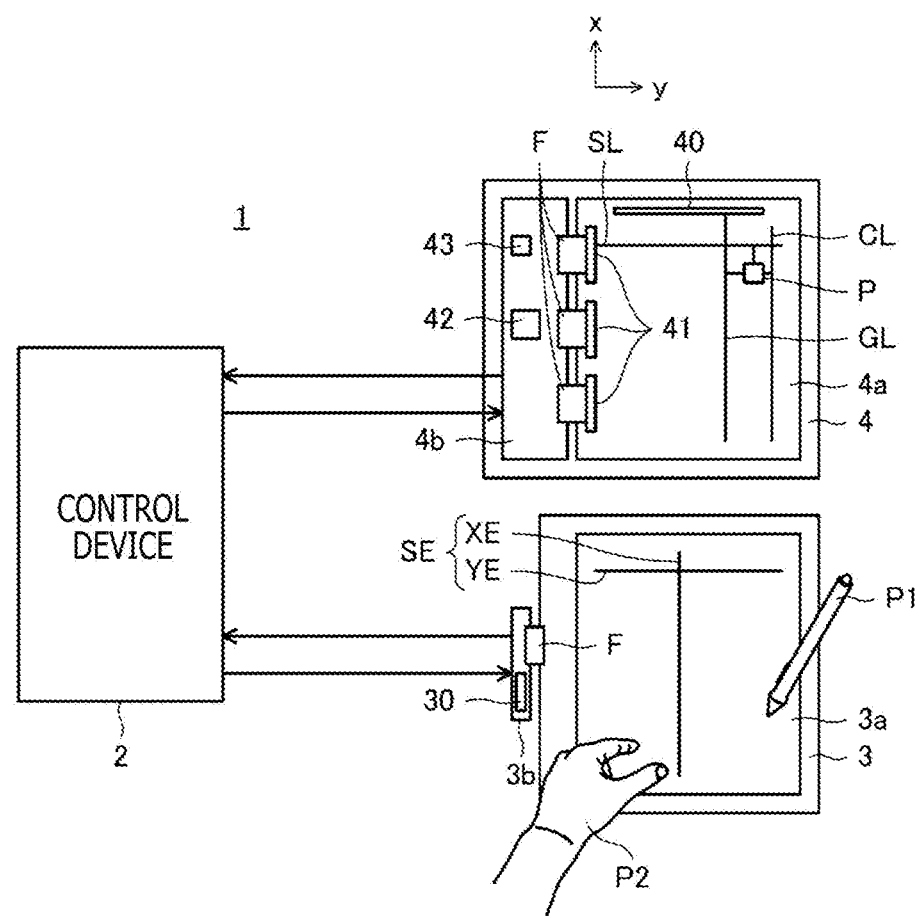
FIG. 1 is a diagram depicting the configuration of a position detection system according to a first embodiment of the present disclosure.

FIG. 1 is a diagram depicting the configuration of a position detection system 1 according to a first embodiment of the present disclosure. As depicted in FIG. 1, the position detection system 1 according to the present embodiment is configured to have a control device 2, a touch panel 3, and a display device 4.

The position detection system 1 is a tablet terminal, for example. The control device 2 is a device that carries out control of the touch panel 3 and the display device 4. For example, if the position detection system 1 is a tablet terminal, the control device 2 is a processor included in the tablet terminal. In the following, the description will be continued based on the premise that the position detection system 1 is a tablet terminal and the control device 2 includes a processor and a memory storing instructions that, when executed by the processor, cause the control device 2 to perform the functions of the control device 2 described herein.

The display device 4 is a device that has plural pixel electrodes and carries out display of image data by driving each of the plural pixel electrodes. As specific examples of the display device 4, liquid crystal display, organic EL display, electronic paper, and so forth are cited. Although the description will be continued based on the premise that the display device 4 is a liquid crystal display in the following, description will be made also regarding the display device 4 that is an organic EL display or electronic paper as modification examples at the end part of the present specification. As depicted in FIG. 1, the display device 4 is configured to have a display screen 4a and a circuit board 4b. The display screen 4a is configured to have gate lines GL on N rows (N≥2) that each extend in an x direction depicted in the diagram (direction in the display surface) and are disposed at equal intervals in a y direction depicted in the diagram (direction orthogonal to the x direction in the display surface), source lines SL on M columns (M≥2) that each extend in the y direction and are disposed at equal intervals in the x direction, and N×M pixels P disposed at the intersections of these lines one by one. The display screen 4a is configured to further have a gate driver group 40 including N gate drivers GD (see FIG. 2 to be described later) each connected to a respective one of the gate lines GL on the N rows, a source driver group 41 including M source drivers SD (see FIG. 2 to be described later) each connected to a respective one of the source lines SL on the M columns, and a common potential line CL connected to each pixel P.

Figure 2A:
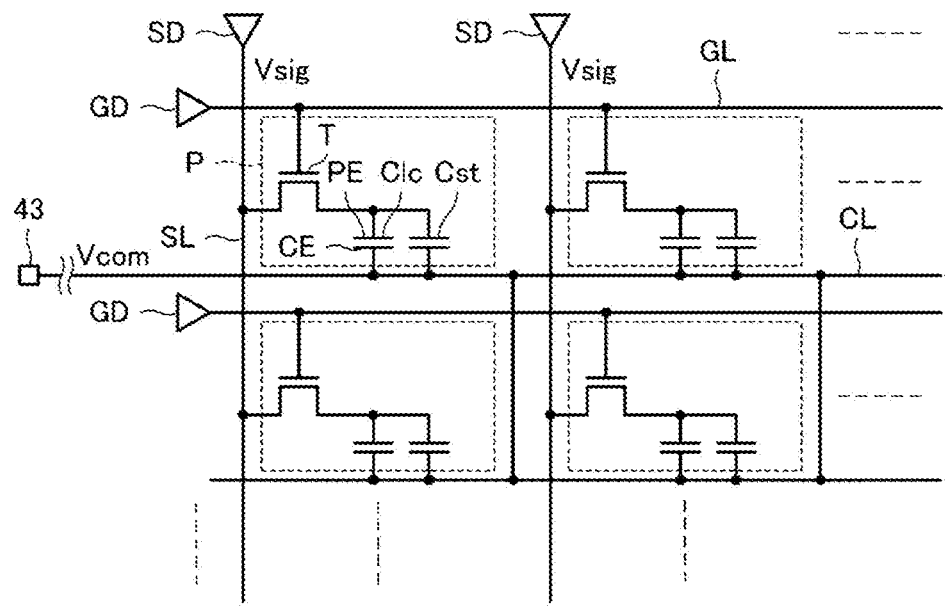
FIG. 2A is a diagram depicting the internal configuration of a display screen depicted in FIG. 1.

FIG. 2A is a diagram depicting the internal configuration of the display screen 4a. As depicted in FIG. 2A, each pixel P is configured to have a transistor T, liquid crystal capacitance Clc, and storage capacitance Cst. Furthermore, the gate driver GD is connected to each gate line GL and the source driver SD is connected to each source line SL. The gate drivers GD are drive circuits that control the potential of the corresponding gate line GL and the source drivers SD are drive circuits that control the potential of the corresponding source line SL.

In each pixel P, the control electrode of the transistor T is connected to the corresponding gate line GL and one controlled electrode is connected to the corresponding source line SL. Furthermore, the liquid crystal capacitance Clc and the storage capacitance Cst are connected in parallel between the other controlled electrode of the transistor T and the common potential line CL. The electrode of the liquid crystal capacitance Clc on the side of the transistor T forms a pixel electrode PE and the electrode on the side of the common potential line CL forms a common electrode CE.

A predetermined common potential Vcom is supplied from a common potential control circuit 43 to the common potential line CL at least at the time of driving of the pixel electrode PE.

Although not depicted in the diagram, for each pixel P, a liquid crystal layer, a light source, first and second polarizing plates, and a color filter are disposed besides the above-described respective configurations. The light source, the first polarizing plate, the pixel electrode PE, the liquid crystal layer, the common electrode CE, the color filter, and the second polarizing plate are disposed in that order in a layer manner and thereby a liquid crystal cell is configured. The polarization directions of the first and second polarizing plates are different from each other by 90 degrees. The color filter is any of red (R), green (G), and blue (B), for example. The pixels P corresponding to these respective colors are evenly disposed in the display surface based on a predetermined arrangement rule.

Operation of the pixel P will be described. When a certain gate line GL is activated by control of a timing control circuit 42 to be described later, the transistor T of each pixel P connected to the gate line GL has an on-state. Thereby, the potential of the corresponding source line SL is supplied to the pixel electrode PE of these respective pixels P. The timing control circuit 42 controls the potential supplied to the pixel electrode PE of each pixel P by supplying a video signal Vsig to each source line SL individually in this state. Thereby, the brightness of each pixel P connected to the activated gate line GL is individually controlled and arbitrary displaying in the display screen 4a is implemented.

Figure 2B:
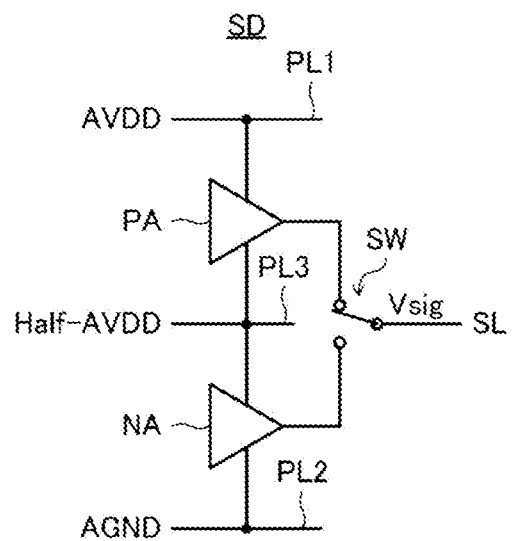
FIG. 2B is a diagram depicting the internal configuration of a source driver depicted in FIG. 2A.

FIG. 2B is a diagram depicting the internal configuration of the source driver SD. As depicted in FIG. 2B, the source driver SD is configured to have a power supply line PL1 to which a high-side power supply potential AVDD is supplied, a power supply line PL2 to which a low-side power supply potential AGND is supplied, and a power supply line PL3 to which an intermediate potential Half-AVDD between the high-side power supply potential AVDD and the low-side power supply potential AGND is supplied. The source driver SD is configured to further have an amplifying circuit PA connected between the power supply lines PL1 and PL3, an amplifying circuit NA connected between the power supply lines PL3 and PL2, and a switch element SW in which one contact is connected to the output terminal of the amplifying circuit PA and the other contact is connected to the output terminal of the amplifying circuit NA and a common contact forms the output of the source driver SD. The above-described video signal Vsig is formed by the potential that appears at the common contact of the switch element SW.

Here, the principles of the liquid crystal cell will be simply described. The principles of the liquid crystal cell are various depending on the liquid crystal agent and the pixel structure. In the present embodiment, as one example, description will be made by taking the liquid crystal cell that carries out the following operation as an example. Specifically, light is transmitted when a voltage is applied from the common potential Vcom that is a reference potential and light is not transmitted in a pixel to which a voltage is not applied. Furthermore, gradation is expressed based on the voltage held in the pixel P.

In the liquid crystal cell, based on the potential difference between the pixel electrode PE and the common electrode CE, the amount of twist of the liquid crystal layer located between them is controlled. When the amount of twist of the liquid crystal layer becomes the value that causes light to be transmitted at the highest degree, most of light that has been emitted from the light source and passed through the first polarizing plate passes through the second polarizing plate, which makes the state in which the brightness is the highest. On the other hand, when the amount of twist of the liquid crystal layer becomes the value with which transmission of light is prevented at the highest degree, most of light that has been emitted from the light source and passed through the first polarizing plate can not pass through the second polarizing plate, which makes the state in which the brightness is the lowest. Therefore, the brightness of each pixel P can be controlled by controlling the potential of the pixel electrode PE.

The timing control circuit 42 to be described later controls the output potential of either one of the amplifying circuits PA and NA (that is, value of the video signal Vsig) according to the brightness that should be set for each pixel P, and controls the switch element SW to cause the output potential of the one to form the output potential of the source driver SD. Due to this, when the output potential of the amplifying circuit PA is the control target, the potential of the corresponding pixel electrode PE becomes an arbitrary value between the intermediate potential Half-AVDD and the high-side power supply potential AVDD. On the other hand, when the output potential of the amplifying circuit NA is the control target, the potential of the corresponding pixel electrode PE becomes an arbitrary value between the intermediate potential Half-AVDD and the low-side power supply potential AGND.

When the potential of the pixel electrode PE is equal to the intermediate potential Half-AVDD, the liquid crystal layer of the corresponding pixel P is in the state of being not twisted. Therefore, the brightness becomes the minimum value. On the other hand, when the potential of the pixel electrode PE is equal to the high-side power supply potential AVDD or the low-side power supply potential AGND, the liquid crystal layer of the corresponding pixel P is in the state of being twisted by 90 degrees. Therefore, the brightness becomes the maximum value. The reason why the same result is obtained whether the potential of the pixel electrode PE is the high-side power supply potential AVDD or the low-side power supply potential AGND is because the amount of twist becomes the same value whereas the orientation of the twist of the liquid crystal layer is different. In the following, a driving method of the pixel electrode PE in which the potential of the pixel electrode PE is changed between the intermediate potential Half-AVDD and the high-side power supply potential AVDD will be referred to as "plus-side driving" and a driving method of the pixel electrode PE in which the potential of the pixel electrode PE is changed between the intermediate potential Half-AVDD and the low-side power supply potential AGND will be referred to as "minus-side driving."

In the display device 4, operation of each source driver SD is controlled in such a manner that the pixels P of the plus-side driving and the pixels P of the minus-side driving are alternately disposed as viewed in the direction of the gate line GL and the driving method in the individual pixels P is switched between the plus-side driving and the minus-side driving for each frame to be described later. The purpose of employing such control is to prevent the occurrence of a situation in which a bias occurs in the rotation direction of the liquid crystal layer in the display surface and in the individual pixels P and the lowering of the displaying quality, such as strips and flicker, occurs as a result.

Referring back to FIG. 1, the circuit board 4b is a circuit board on which the timing control circuit 42 and the common potential control circuit 43 are formed. The timing control circuit 42 and the common potential control circuit 43 are each configured by a circuit or microcomputer formed on the board. In other words, each of the timing control circuit 42 and the common potential control circuit 43 may be realized by discrete circuit components and/or a processor and a memory storing instructions that, when executed by the processor, cause the processor to perform the respective functions of the timing control circuit 42 and the common potential control circuit 43 described herein. Additionally, the timing control circuit 42 and the common potential control circuit 43 are connected to the display screen 4a by one or more flexible printed boards F in which interconnects are incorporated. The common potential control circuit 43 plays a role in supplying the common potential Vcom that is a fixed potential to the common potential line CL as described above. The timing control circuit 42 will be described later.

The touch panel 3 is a device that detects the position of a stylus P1 and a finger P2 depicted in FIG. 1 in a touch surface and is configured to have a sensor 3a and a circuit board 3b as depicted in FIG. 1. The stylus P1 is the above-described active pen (stylus corresponding to the active capacitive system) and is configured to communicate with frequencies that belong to predetermined frequency bands with a touch sensor 30 to be described later by a charge induced in a sensor electrode SE to be described later.

In the sensor 3a, the sensor electrode SE composed of plural electrodes XE (first electrodes) that are each formed to extend in the x direction and are disposed at equal intervals in the y direction and plural electrodes YE (second electrodes) that are each formed to extend in the y direction and are disposed at equal intervals in the x direction is disposed. The sensor 3a is disposed to overlap with the display surface of the display device 4 and thereby the touch panel 3 is configured to be capable of detecting the position of the stylus P1 and the finger P2 over the display surface.

The circuit board 3b is a circuit board on which the touch sensor 30 is formed. The touch sensor 30 is configured by a circuit or microcomputer formed on the board and is connected to the sensor 3a by one or more flexible printed boards F in which interconnects are incorporated. The touch sensor 30 is configured to, through this connection, detect the position of the stylus P1 and the finger P2 in the touch surface and communicate with the stylus P1.

Here, the tablet terminal is classified into "In-Cell type," "On-Cell type," or "Out-Cell type" depending on the relationship between the plural electrodes XE and the common potential line CL (common electrode CE). The position detection system 1 according to the present embodiment may be any type among them.

In the "In-Cell type," the plural electrodes XE and the common potential line CL are configured by the same physical interconnect or physical electrode pattern. Therefore, while the display device 4 is carrying out driving operation of the pixel electrodes PE, the potential of the plural electrodes XE is fixed to the common potential Vcom. While the potential of the plural electrodes XE is thus fixed to the common potential Vcom, the touch sensor 30 can not carry out the above-described position detection and communication with the stylus P1.

In the "On-Cell type" or "Out-Cell type," the plural electrodes XE and the common potential line CL are configured by physical interconnects different from each other. Therefore, differently from the "In-Cell type," the potential of the plural electrodes XE is not fixed to the common potential Vcom even while the display device 4 is carrying out driving operation of the pixel electrodes PE. However, in the tablet terminal of the background art, the above-described display noise (capacitive noise that occurs in the sensor electrode SE due to the occurrence of voltage vibration in interconnects in the display device 4 caused by driving of the plural pixel electrodes PE) occurs in association with driving operation of the pixel electrodes PE. Therefore, after all, the touch sensor 30 can not carry out the above-described position detection and communication with the stylus P1 while the display device 4 is carrying out driving operation of the pixel electrodes PE. If the period in which the operation of the touch sensor 30 is limited as above exists, the position detection rate and the rate of communication with the stylus P1 lower correspondingly, so that the quality of rendering processing based on data transmitted by the stylus P1 deteriorates in some cases. Therefore, an improvement is required.

Furthermore, there occur events that the stylus P1 erroneously recognizes the display noise generated outside the noise free period as the uplink signal and that the sensitivity of the sensor circuit disposed in the stylus P1 lowers due to the display noise generated outside the noise free period. This results in the deterioration of the quality of rendering processing based on data transmitted by the stylus P1, such as failure in rendering due to malfunction of the stylus P1, in some cases. So, an improvement is required also regarding this point.

The present disclosure suppresses at least frequency components that belong to the frequency bands used for communication between the stylus P1 and the touch sensor 30 in the display noise. Thereby, regarding the position detection system 1 of the "On-Cell type" or "Out-Cell type," the present disclosure makes communication between the stylus P1 and the touch sensor 30 be independent of driving operation of the pixel electrodes PE by the display device 4 (that is, enables the touch sensor 30 to detect the stylus P1 asynchronously with driving of the plural pixel electrodes PE by the display device 4). Thereby, the present disclosure intends to avoid such deterioration of the rendering quality. In addition, the present disclosure intends to avoid also the deterioration of the rendering quality caused by the occurrence of an event that rendering is impossible because of malfunction of the stylus P1 due to erroneous recognition of the display noise generated outside the noise free period as the uplink signal by the stylus P1 and the lowering of the sensitivity of the sensor circuit disposed in the stylus P1 caused by the display noise generated outside the noise free period.

Operation of the touch sensor 30 will be described in detail. First, description will be made regarding position detection of the finger P2. The touch sensor 30 is configured to sequentially send out, to the respective electrodes XE, a predetermined signal for finger detection that is a signal with a predetermined frequency belonging to a predetermined frequency band and sequentially carry out detection by the respective electrodes YE every time the signal is sent out. When the finger P2 is close to the intersection of a certain electrode XE and a certain electrode YE, part of the signal for finger detection detected after passing through the intersection passes through the finger P2 to be absorbed by the human body. Thus, the detection level of the signal for finger detection in the touch sensor 30 lowers. The touch sensor 30 carries out position detection of the finger P2 by detecting this lowering of the detection level.

Next, description will be made regarding position detection of the stylus P1. The stylus P1 that is an active pen is configured to periodically send out a pen signal, for example. The pen signal is a signal with a predetermined frequency included in a predetermined frequency band and is configured to include a burst signal that is an unmodulated carrier wave and a data signal obtained by modulating a carrier wave based on transmission data. The touch sensor 30 attempts detection of the burst signal by each of the respective plural electrodes XE and YE and detects the position of the stylus P1 based on the detection result. Furthermore, the touch sensor 30 receives data transmitted by the stylus P1 by detecting the data signal by using the electrodes closest to the position thus detected in the respective plural electrodes XE and YE and demodulating the data signal.

The touch sensor 30 may be configured to send out a beacon signal from the sensor 3a at predetermined time intervals. In the beacon signal, a command for controlling the stylus P1 from the touch sensor 30 is included. The contents of control by the command include transmission of writing pressure data depicting the pressure applied to the pen tip of the stylus P1, transmission of the pressing-down state of various switches disposed in the stylus P1, transmission of a unique ID stored in the stylus P1 in advance, and so forth, for example. The stylus P1 in this case is configured to send out the pen signal in response to reception of the beacon signal. Furthermore, the stylus P1 is configured to use data instructed to be transmitted by the command included in the beacon signal as the transmission data.

The touch sensor 30 is configured to output, to the control device 2, the detected position of the stylus P1 and the finger P2 and the data received from the stylus P1. The control device 2 is configured to control displayed contents of the display device 4 based on the position and the data thus supplied.

The overall outline of the position detection system 1 is described so far. Next, detailed description will be made about processing performed by the position detection system 1 according to the present embodiment in order to avoid the deterioration of the rendering quality due to the display noise by making communication operation of the stylus P1 and the touch sensor 30 be independent of driving operation of the pixel electrodes PE by the display device 4.

Figure 3:
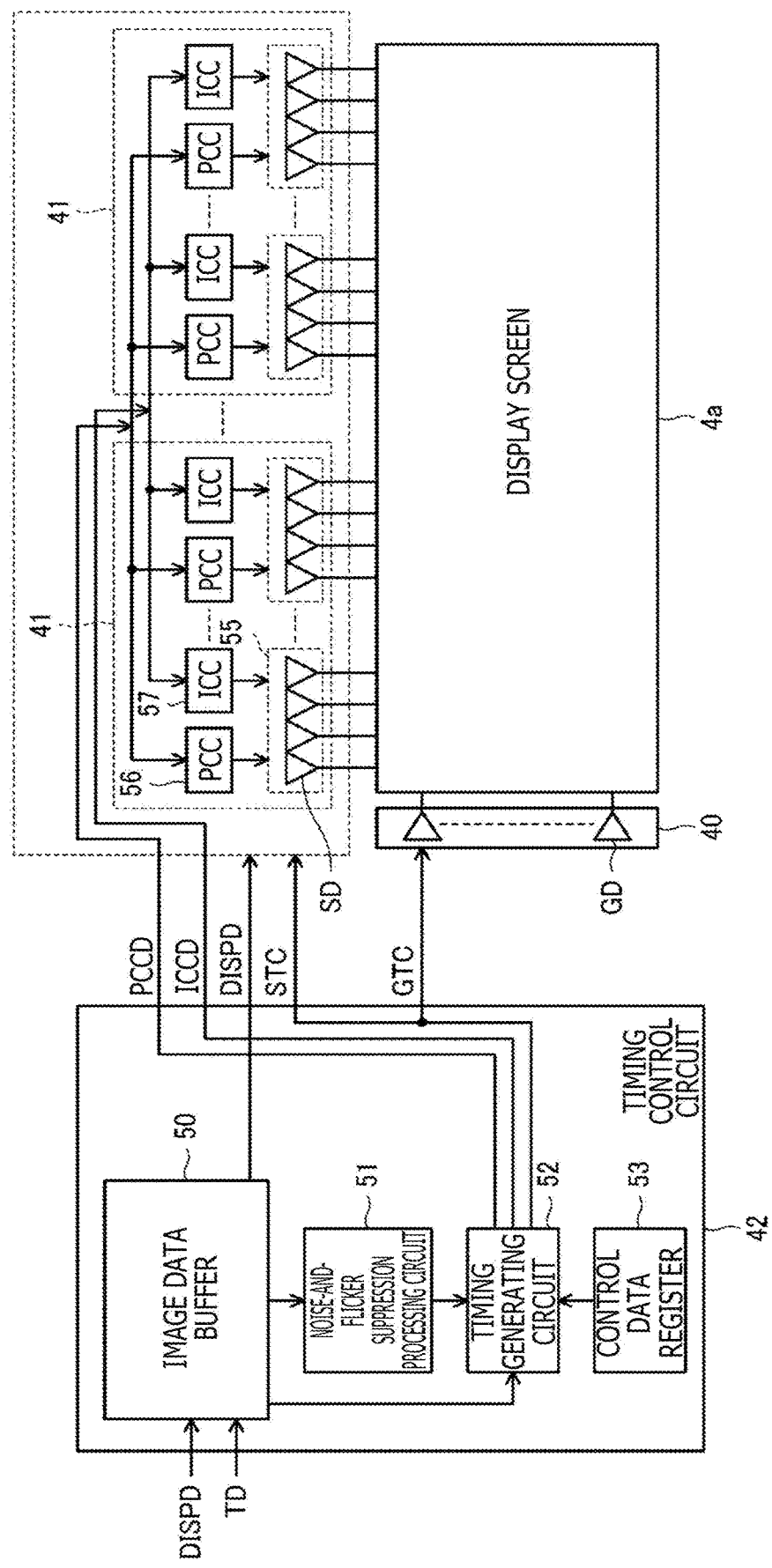
FIG. 3 is a diagram depicting the internal configuration of a timing control circuit and a source driver group according to the first embodiment of the present disclosure.

FIG. 3 is a diagram depicting the internal configuration of the timing control circuit 42 and the source driver group 41 according to the first embodiment of the present disclosure. As depicted in FIG. 3, the timing control circuit 42 is configured to include an image data buffer 50, a noise-and-flicker suppression processing circuit 51, a timing generating circuit 52, and a control data register 53. Furthermore, the source driver group 41 is configured to have plural source groups 55 each including plural source drivers SD and a polarity control circuit (PCC) 56 and an inversion control circuit (ICC) 57 disposed for each source group 55.

To the image data buffer 50, image data DISPD and timing data TD including various control signals such as data enable signal, clock signal, reset signal, frame synchronization signal, and line synchronization signal are supplied from the control device 2 depicted in FIG. 1. The image data buffer 50 is configured to temporarily store the image data DISPD sequentially supplied. The image data DISPD is data including the brightness of each pixel P. The time for which the image data DISPD of one screen is displayed is referred to as one frame. In this time, the time for which the image data DISPD of the horizontal direction (one horizontal line) is displayed is referred to as one line period. The control by the timing control circuit 42 is carried out in units of frame and in units of line basically.

The timing generating circuit 52 refers to the image data DISPD and the timing data TD input to the timing control circuit 42 and controls the gate driver group 40 and the source driver group 41. The timing generating circuit 52 may be realized discrete circuit components and/or a processor and a memory storing instructions that, when executed by the processor, cause the processor to perform the functions of the timing generating circuit 52 described herein. Specifically, the timing generating circuit 52 is configured to generate a gate timing control signal GTC and a source driver control signal STC in matching with timing set in advance (timing stored in the control data register 53 from a memory or the like that is not depicted separately at the time of power supply activation) based on the timing data TD (particularly data enable signal, frame synchronization signal, and line synchronization signal) and supply the signals GTC and STC to the gate driver group 40 and the source driver group 41, respectively. Each gate driver GD in the gate driver group 40 is configured to operate at timing that conforms to this gate timing control signal GTC. Furthermore, each source driver SD in the source driver group 41 is configured to operate at timing that conforms to this source driver control signal STC.

Besides, the timing generating circuit 52 has a function of generating a polarity control signal PCCD and an inversion control signal ICCD in accordance with control of the noise-and-flicker suppression processing circuit 51 and supplying the signals PCCD and ICCD to the polarity control circuit 56 and the inversion control circuit 57, respectively. Details of this function will be described later.

The control data register 53 is a memory device that stores patterns of the driving method of each pixel electrode PE (hereinafter, referred to as "inversion patterns"). As described in detail later, in the inversion patterns stored by the control data register 53 according to the present embodiment, two kinds of inversion patterns, an inversion pattern H1Dot (first inversion pattern) and an inversion pattern H1+2Dot (second inversion pattern), are included.

The inversion pattern H1Dot is an inversion pattern in which the pixels P of the plus-side driving and the pixels P of the minus-side driving are alternately disposed as viewed in the direction of the gate line GL. Therefore, when the pixel P of the plus-side driving is represented as "+" and the pixel P of the minus-side driving is represented as "−," the respective pixels P are disposed to make "+−+−+−+ . . . −" or "−+−+−+−+ . . . " as viewed in the direction of the gate line GL. In the following, the description will be continued based on the premise that the former "+−+−+−+ . . . . " is used as the inversion pattern H1Dot. However, the latter "−+−+−+−+ . . . " may be used as the inversion pattern H1Dot.

On the other hand, the inversion pattern H1+2Dot is an inversion pattern in which the pixels P of the plus-side driving and the pixels P of the minus-side driving are alternately disposed two by two as viewed in the direction of the gate line GL. However, to the pixel P located at the end part in the direction of the gate line GL, the driving method different from the pixel P adjacent in the direction of the gate line GL is allocated. Therefore, the respective pixels P are disposed to make "+−−++−−++ . . . " or "−++−−++−− . . . " as viewed in the direction of the gate line GL. In the following, the description will be continued based on the premise that the former "+−−++−−++ . . . " is used as the inversion pattern H1+2Dot. However, the latter "−++−−++−− . . . " may be used as the inversion pattern H1+2Dot.

Although examples in which the above two kinds of inversion patterns are used will be described in the present embodiment, it is obvious that inversion patterns other than them may be used.

The timing generating circuit 52 performs processing of deciding the inversion pattern set in the respective inversion control circuits 57 in accordance with control by the noise-and-flicker suppression processing circuit 51 to be described later and writing the decided inversion pattern to the inversion control circuits 57 by using the inversion control signal ICCD. The inversion control circuits 57 have a function of storing the inversion pattern thus written and setting the contents thereof in each of the corresponding plural source drivers SD.

Moreover, the timing generating circuit 52 performs also processing of deciding, regarding each frame, polarity depicting whether or not to invert the inversion pattern stored in the inversion control circuits 57 and writing the decided polarity to the respective polarity control circuits 56 by using the polarity control signal PCCD. The polarity control circuits 56 have a function of storing the polarity thus written and setting the contents thereof in each of the corresponding plural source drivers SD.

The polarity will be described in detail. As the polarity written to the polarity control circuits 56, there are two kinds of polarities, plus polarity and minus polarity. The plus polarity is polarity indicating that the inversion pattern stored in the inversion control circuit 57 is used as it is, and the source driver SD in which the plus polarity is set operates based on the inversion pattern set by the inversion control circuit 57. On the other hand, the minus polarity is polarity indicating that the inversion pattern stored in the inversion control circuit 57 is inverted to be used, and the source driver SD in which the minus polarity is set operates based on the inverted pattern of the inversion pattern set by the inversion control circuit 57. To cite one example, if an inversion pattern "+−+−+−+− . . . " is set by the inversion control circuit 57 about a certain source driver SD and the minus polarity is set by the polarity control circuit 56, the source driver SD operates based on an inversion pattern "−+−+−+−+ . . . ."

The timing generating circuit 52 inverts the polarity written to each polarity control circuit 56 individually. Thereby, as described above, switching the driving method in the individual pixels P between the plus-side driving and the minus-side driving based on each frame is implemented.

Figure 4:
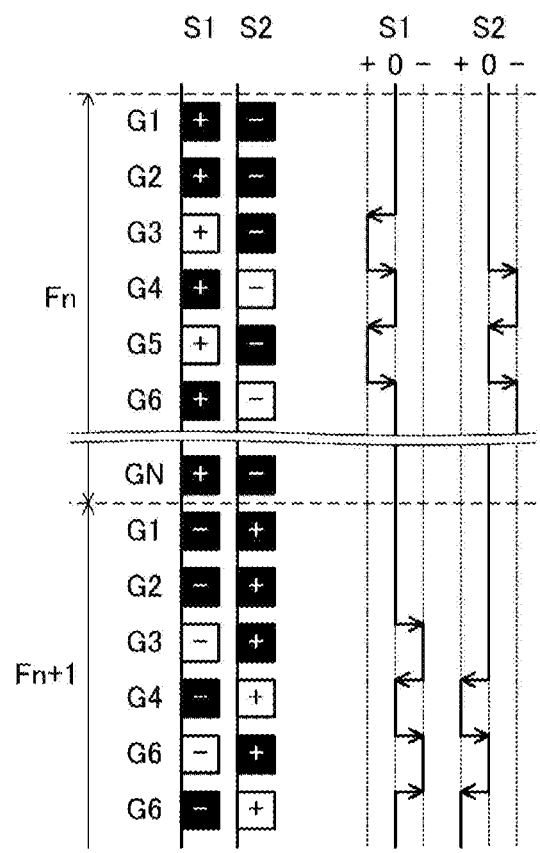
FIG. 4 is a diagram explaining the outline of a driving method of source lines.

FIG. 4 is a diagram explaining the outline of the driving method of the pixel electrodes PE by the timing generating circuit 52. Symbols S1 and S2 depicted in FIG. 4 each represent a source line SL. Although only two source lines SL are depicted in FIG. 4 for simplification, more source lines SL are disposed actually. Furthermore, symbols G1 to GN represent each of the gate lines GL of N rows and symbols Fn and Fn+1 represent the n-th and (n+1)-th frames, respectively.

Furthermore, in FIG. 4 and the respective diagrams to be depicted later, the brightness set in each pixel P by the image data DISPD is represented by the color of a respective one of plural squares disposed at the intersections of the source line SL and the gate line GL. Although actually plural levels of the brightness at intermediate grayscale levels are set between the minimum brightness and the maximum brightness, here only black squares that represent the minimum brightness and white squares that represent the maximum brightness are depicted for simplification. The plus symbol depicted in the square indicates that the corresponding pixel P is driven by the above-described plus-side driving, and the minus symbol indicates that the corresponding pixel P is driven by the above-described minus-side driving.

Moreover, on the right side of FIG. 4, the state of the potential of each source line SL is depicted. "0" represents the intermediate potential Half-AVDD. "+" represents the high-side power supply potential AVDD and "−" represents the low-side power supply potential AGND. Thick lines depict change in the potential of the respective source lines SL.

The basic flow of processing performed by the timing control circuit 42 will be described below also with reference to a processing flowchart in addition to FIG. 4.

Figure 5:
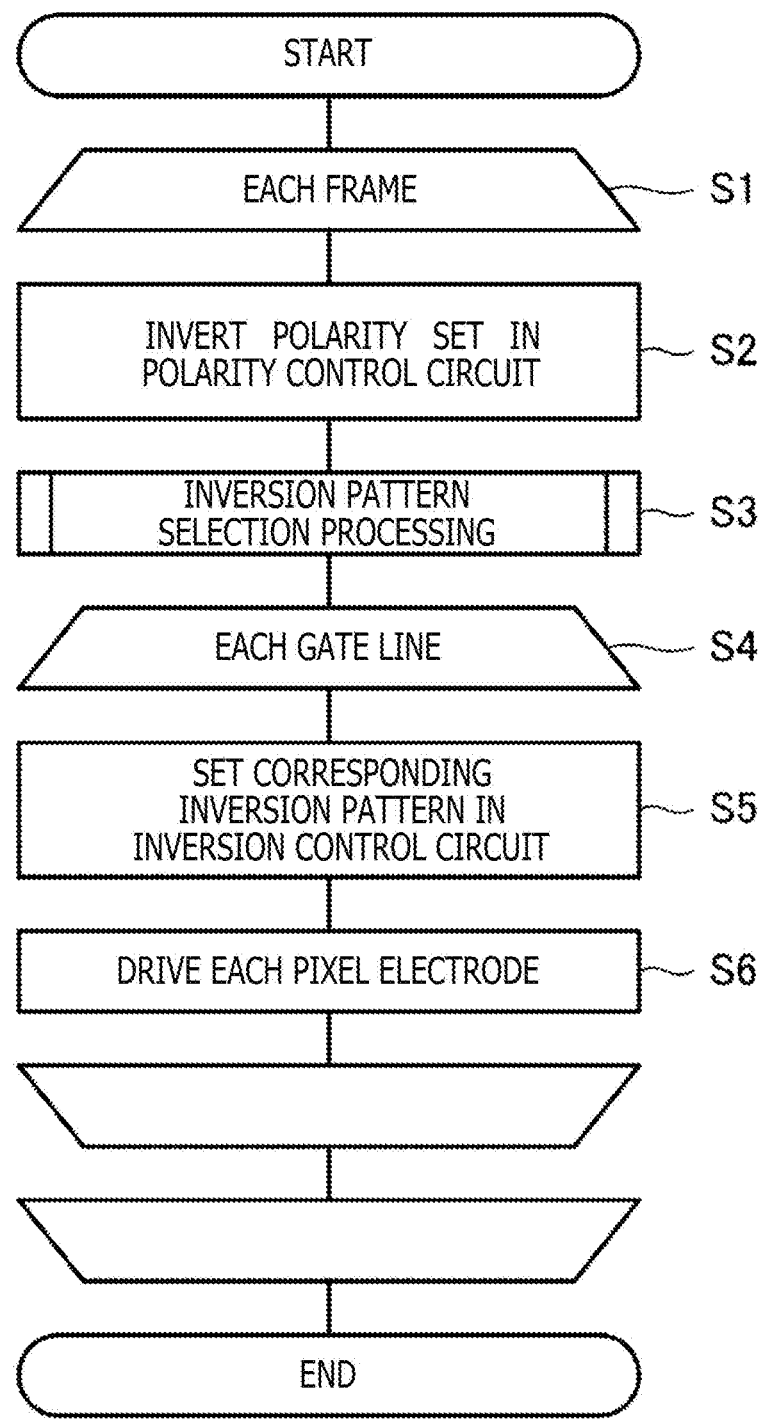
FIG. 5 is a flowchart of processing performed by the timing control circuit depicted in FIG. 3.

FIG. 5 is a flowchart of the processing performed by the timing control circuit 42. As depicted in FIG. 5, the timing control circuit 42 is configured to repeat processing of S2 to S6 for each frame (S1).

In the processing of the S2 to S6, first the timing control circuit 42 inverts the polarity set in each polarity control circuit 56 (S2). Specifically, when the polarity set in the polarity control circuit 56 is the plus polarity, the timing control circuit 42 sets the minus polarity through overwriting. When the polarity set in the polarity control circuit 56 is the minus polarity, the timing control circuit 42 sets the plus polarity through overwriting. In the example of FIG. 4, the plus polarity is set in each polarity control circuit 56 in the frame Fn and the minus polarity is set in each polarity control circuit 56 in the frame Fn+1.

Next, the timing control circuit 42 performs inversion pattern selection processing for deciding the inversion pattern set in the inversion control circuits 57 for each gate line GL (S3). Details of the inversion pattern selection processing will be described later. In FIG. 4, the inversion pattern H1Dot is used regarding all gate lines GL and here the description will be continued on the premise of this state.

Subsequently, the timing control circuit 42 sequentially performs the processing of S5 and S6 regarding each gate line GL (S4). Specifically, first, the inversion pattern selected regarding the corresponding gate line GL in the inversion pattern selection processing of S4 is set in each inversion control circuit 57 (S5). Then, driving of each pixel electrode PE is carried out (S6). Specifically, the processing of S6 is processing of activating the corresponding gate line GL through the gate driver GD and supplying the video signal Vsig to the corresponding source line SL through the source driver SD. Due to the processing of the latter, the potential of each source line SL changes as depicted in the diagram on the right side of FIG. 4 and thereby the brightness of each pixel P changes. The change direction of the potential of the source line SL at this time is defined by the inversion pattern set in the corresponding inversion control circuit 57 and the polarity set in the polarity control circuit 56. After the processing of the S5 and S6 ends regarding all gate lines GL, the timing control circuit 42 returns to the S2 and continues the processing.

Next, the inversion pattern selection processing performed at S4 in FIG. 5 will be described in detail. In the following, first an outline of the inversion pattern selection processing will be described with reference to FIGS. 6A and 6B and FIG. 7 and thereafter the flow of the inversion pattern selection processing will be described in detail with reference to FIG. 8.

Figure 6A:
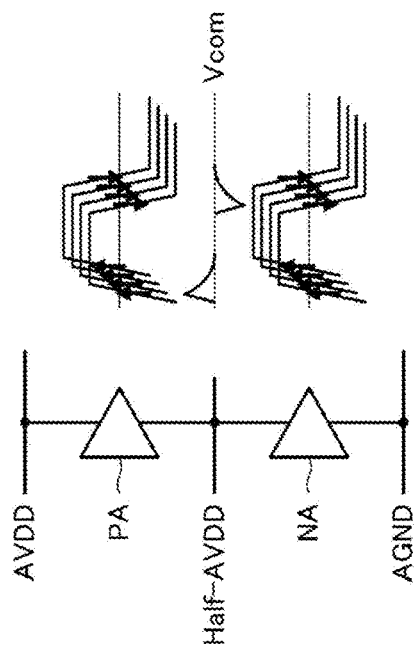
FIGS. 6A and 6B are diagrams depicting a case in which each source line SL is driven with a first inversion pattern.
Figure 6B:
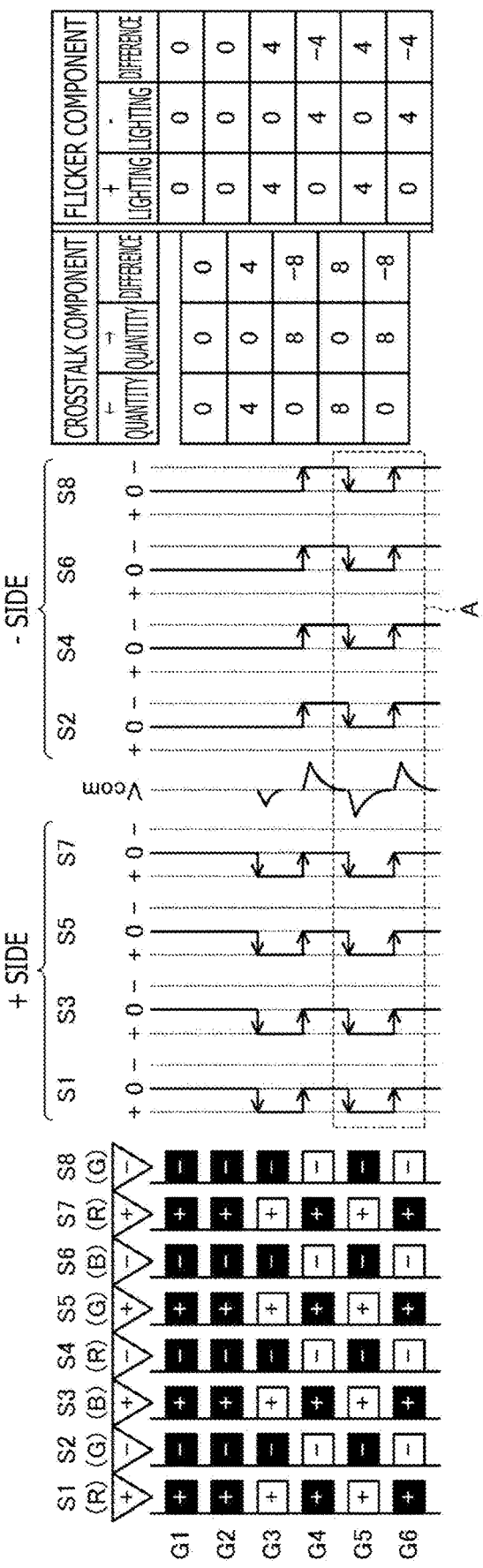
Figure 7A:
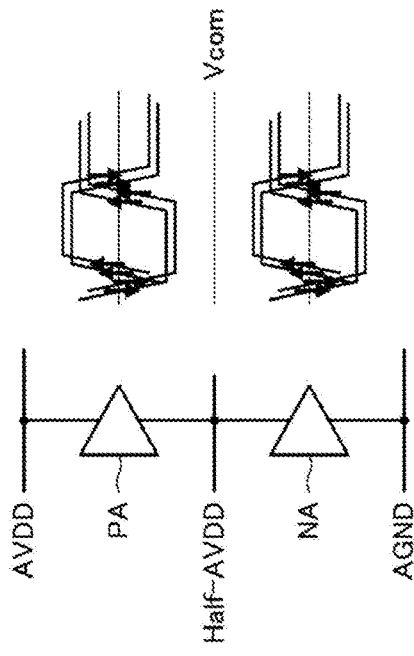
FIGS. 7A and 7B are diagrams depicting a case in which each source line is driven with a second inversion pattern.
Figure 7B:
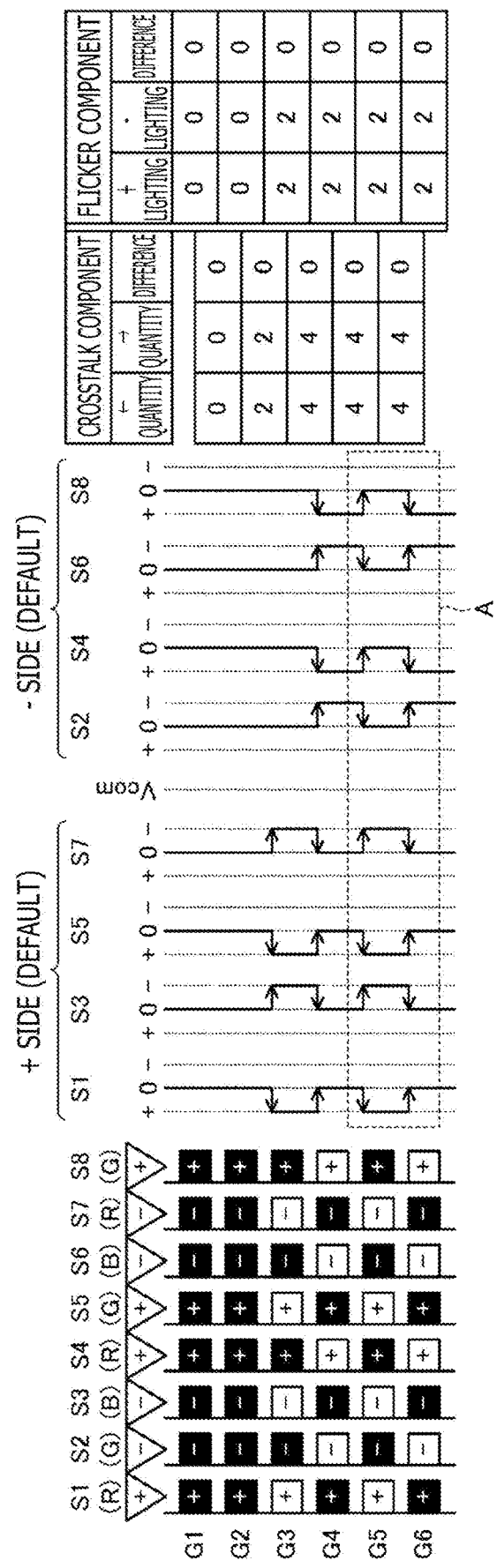

FIGS. 6A and 6B are diagrams depicting a case in which each pixel electrode PE is driven with the inversion pattern H1Dot. Furthermore, FIGS. 7A and 7B are diagrams depicting a case in which each pixel electrode PE is driven with the inversion pattern H1+2Dot. Symbols S1 to S8 depicted in these diagrams each represent a source line SL. The corresponding color (color of the above-described color filter) is depicted in parentheses under each symbol. In addition, symbols G1 to G6 each represent the gate line GL. As the contents of the image data DISPD, the same contents are employed in FIGS. 6A and 6B and FIGS. 7A and 7B.

Referring first to FIGS. 6A and 6B, these diagrams depict a case in which the inversion pattern H1Dot is set in the inversion control circuit 57 corresponding to the source lines S1 to S8 and the plus polarity is set in the polarity control circuit 56 corresponding to the source lines S1 to S8. In this case, as depicted in the diagram, the driving methods of the source lines S1 to S8 are the plus-side driving, the minus-side driving, the plus-side driving, the minus-side driving, the plus-side driving, the minus-side driving, the plus-side driving, and the minus-side driving, respectively.

According to the image data DISPD depicted in FIGS. 6A and 6B, for example, at the time of driving of the gate line G3, the potential of the source lines S1, S3, S5, and S7 changes from 0 to a plus value. At this time, the potential of the source lines S2, S4, S6, and S8 does not change. Therefore, the quantity of source lines SL with change in the plus direction (number depicted as "←quantity" in FIG. 6B, the same shall apply hereinafter) is 4 and the quantity of source lines SL with change in the minus direction (number depicted as "→quantity" in FIG. 6B, the same shall apply hereinafter) is 0. Therefore, the difference between them (hereinafter, referred to as "varying potential difference") is 4.

The absolute value of the varying potential difference serves as an index depicting whether or not the display noise occurs. Specifically, the varying potential difference represents imbalance of the total of the potential difference in driving in the positive direction and the negative direction. If the varying potential difference is not 0, a voltage vibration occurs in the common potential line CL as depicted in FIGS. 6A and 6B. This voltage vibration becomes the display noise and generates capacitive noise in the sensor electrode SE of the touch panel 3. Therefore, it is preferable that the absolute value of the varying potential difference be a value that is as close to 0 as possible, and it is more preferable that the absolute value be 0.

In the example of FIGS. 6A and 6B, the absolute value of the varying potential difference becomes a value that is not 0 also at the time of driving of the gate lines G4 to G6. Specifically, at the time of driving of the gate line G4, the potential of the source lines S1, S3, S5, and S7 changes from a plus value to 0 and the potential of the source lines S2, S4, S6, and S8 changes from 0 to a minus value. Therefore, the quantity of source lines SL with change in the plus direction is 0 and the quantity of source lines SL with change in the minus direction is 8. Thus, the absolute value of the varying potential difference is 8. In this case, a larger voltage vibration than at the time of driving of the gate line G3, in which the absolute value of the varying potential difference is 4, occurs in the common potential line CL, so that large display noise occurs. Also regarding the gate lines G5 and G6, the absolute value of the varying potential difference becomes 8 similarly, so that large display noise occurs.

Furthermore, when a state in which the pixel P is in a bright state due to the plus-side driving is referred to as "plus lighting" and a state in which the pixel P is in a bright state due to the minus-side driving is referred to as "minus lighting," for example, at the time of driving of the gate line G3, the number of pixels of the plus lighting becomes 4 and the number of pixels of the minus lighting becomes 0. Therefore, the difference between them (hereinafter, referred to as "lighting quantity difference") is 4.

The absolute value of the lighting quantity difference serves as an index depicting whether or not flicker occurs in the display device 4. If the absolute value of the lighting quantity difference is not 0, flicker occurs in the display surface of the display device 4, which gives a feeling of discomfort to the user. Therefore, it is preferable that the absolute value of the lighting quantity difference be also a value that is as close to 0 as possible, and it is more preferable that the absolute value be 0.

In the example of FIGS. 6A and 6B, the absolute value of the lighting quantity difference becomes a value that is not 0 also at the time of driving of the gate lines G4 to G6. Specifically, at the time of driving of the gate line G4, the number of pixels of the plus lighting becomes 0 and the number of pixels of the minus lighting becomes 4. Therefore, the absolute value of the lighting quantity difference is 4. Thus, flicker occurs in the display surface of the display device 4 similarly to at the time of driving of the gate line G3. Also regarding the gate lines G5 and G6, the absolute value of the lighting quantity difference becomes 4 similarly, so that flicker occurs in the display surface of the display device 4.

Referring next to FIGS. 7A and 7B, these diagrams depict a case in which the inversion pattern H1+2Dot is set in the inversion control circuit 57 corresponding to the source lines S1 to S8 and the plus polarity is set in the polarity control circuit 56 corresponding to the source lines S1 to S8. In this case, as depicted in the FIG. 7B, the driving methods of the source lines S1 to S8 are the plus-side driving, the minus-side driving, the minus-side driving, the plus-side driving, the plus-side driving, the minus-side driving, the minus-side driving, and the plus-side driving, respectively.

In the example of FIGS. 7A and 7B, for example, at the time of driving of the gate line G3, the potential of the source lines S1 and S5 change from 0 to a plus value, whereas the potential of the source lines S3 and S7 changes from 0 to a minus value. The potential of the source lines S2, S4, S6, and S8 does not change as with the example of FIGS. 6A and 6B. Therefore, the quantity of source lines SL with change in the plus direction is 2 and the quantity of source lines SL with change in the minus direction is 2. Thus, the absolute value of the varying potential difference is 0. Similarly, the absolute value of the varying potential difference is 0 also at the time of driving of the gate lines G4 to G6.

As above, the absolute value of the varying potential difference possibly differs between the case of using the inversion pattern H1Dot and the case of using the inversion pattern H1+2Dot. Therefore, it can be said that reduction in the display noise is enabled by properly selecting and using either of the inversion pattern H1Dot and the inversion pattern H1+2Dot according to the contents of the image data DISPD.

Furthermore, in the example of FIGS. 7A and 7B, for example, at the time of driving of the gate line G3, the number of pixels of the plus lighting becomes 2 and the number of pixels of the minus lighting becomes 2. Thus, the absolute value of the lighting quantity difference is 0. Similarly, the absolute value of the lighting quantity difference is 0 also at the time of driving of the gate lines G4 to G6.

As above, the absolute value of the lighting quantity difference also possibly differs between the case of using the inversion pattern H1Dot and the case of using the inversion pattern H1+2Dot. Therefore, it can be said that reduction in flicker is also enabled by properly selecting and using either of the inversion pattern H1Dot and the inversion pattern H1+2Dot according to the contents of the image data DISPD.

The noise-and-flicker suppression processing circuit 51 depicted in FIG. 3 utilizes such a property of the inversion pattern to carry out noise suppression control to suppress at least frequency components belonging to predetermined frequency bands in the display noise and, in addition thereto, carry out also flicker suppression control to suppress the occurrence of flicker. The noise-and-flicker suppression processing circuit 51 may be realized discrete circuit components and/or a processor and a memory storing instructions that, when executed by the processor, cause the processor to perform the functions of noise-and-flicker suppression processing circuit 51 described herein. Specifically, the noise-and-flicker suppression processing circuit 51 performs processing of selecting the driving method (plus-side driving or minus-side driving) of each pixel electrode PE according to the contents of the image data DISPD by performing the inversion pattern selection processing depicted in FIG. 5. This selection is carried out in units of a gate line GL. The contents of the inversion pattern selection processing will be described in detail below with reference to a flowchart depicted in FIG. 8.

Figure 8:
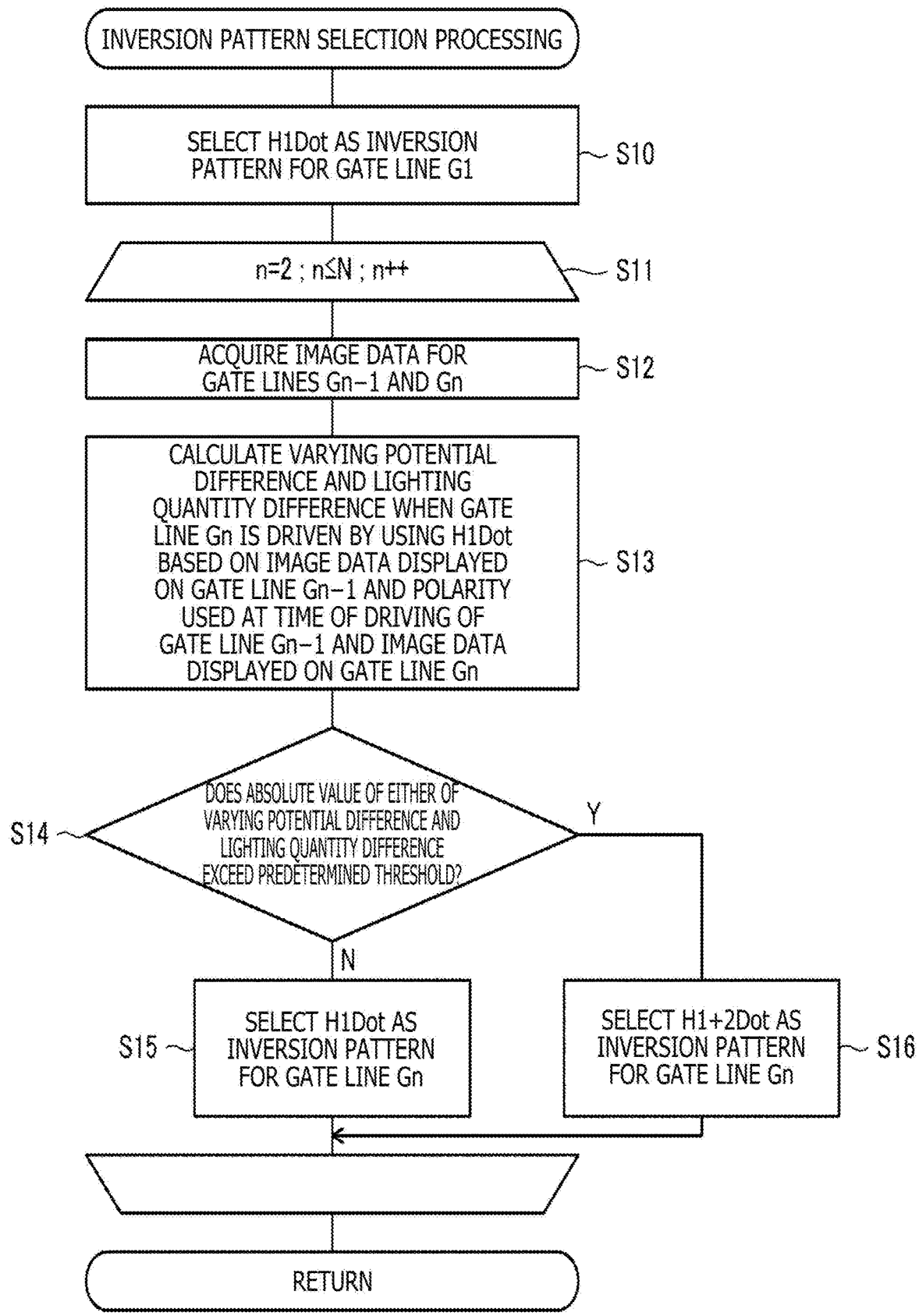
FIG. 8 is a flowchart depicting details of inversion pattern selection processing depicted in FIG. 5.

FIG. 8 is a flowchart depicting details of the inversion pattern selection processing performed by the noise-and-flicker suppression processing circuit 51. As depicted in FIG. 8, first the noise-and-flicker suppression processing circuit 51 selects the inversion pattern H1Dot as the inversion pattern for the gate line G1 (S10).

Next, the noise-and-flicker suppression processing circuit 51 performs processing of S12 to S16 regarding each of the gate lines G2 to GN (S11).

In the processing of S12 to S16, first the noise-and-flicker suppression processing circuit 51 acquires image data corresponding to each of the gate line Gn-1 driven at the (n-1)-th timing and the gate line Gn driven at the n-th timing from the image data DISPD stored in the image data buffer 50 depicted in FIG. 3 (S12).

Next, the noise-and-flicker suppression processing circuit 51 calculates the varying potential difference and the lighting quantity difference when the gate line Gn is driven by using the inversion pattern H1Dot based on the image data displayed on the gate line Gn-1 and the polarity (what is set in the polarity control circuit 56) used at the time of driving of the gate line Gn-1 and the image data displayed on the gate line Gn (S13). The specific calculation methods of the varying potential difference and the lighting quantity difference are as described with reference to FIGS. 6A and 6B and FIGS. 7A and 7B.

Subsequently, the noise-and-flicker suppression processing circuit 51 carries out determination of whether or not the absolute value of any of the calculated varying potential difference and lighting quantity difference exceeds a predetermined threshold (S14). Then, when determining that the absolute value does not exceed the threshold, the noise-and-flicker suppression processing circuit 51 selects the inversion pattern H1Dot as the inversion pattern for the gate line Gn (S15). When determining that the absolute value exceeds the threshold, the noise-and-flicker suppression processing circuit 51 selects the inversion pattern H1+2Dot as the inversion pattern for the gate line Gn (S16).

The noise-and-flicker suppression processing circuit 51 selects the inversion pattern in the above-described manner and sets the selected inversion pattern in the inversion control circuits 57. This makes it possible to suppress the varying potential difference and the lighting quantity difference to a value equal to or smaller than the above-described predetermined threshold regarding substantially all pieces of image data DISPD. Therefore, it becomes possible to suppress at least frequency components that belong to the frequency bands used for communication between the stylus P1 and the touch sensor 30 in the display noise. Thus, it becomes possible to make communication operation of the stylus P1 and the touch sensor 30 be independent of driving operation of the pixel electrodes PE by the display device 4 and thereby avoid the deterioration of the quality of rendering processing based on data transmitted by the stylus P1. Furthermore, it also becomes possible to suppress flicker. Moreover, it also becomes possible to avoid the quality deterioration of the rendering processing based on data transmitted by the stylus P1, such as failure in rendering due to malfunction of the stylus P1.

In FIG. 8, the inversion pattern for the gate line G1 is fixed to the inversion pattern H1Dot. However, the noise-and-flicker suppression processing circuit 51 may deem also the inversion pattern for the gate line G1 as the target of the selection processing. However, in this case, calculation is impossible about the varying potential difference and therefore it is preferable to perform processing similar to the S14 to S16 based on only the lighting quantity difference. Alternatively, the gate line GN employed as the target of the processing last in the previous frame may be used as the gate line Gn-1 to perform the processing of S12 to S16.

Figure 9:
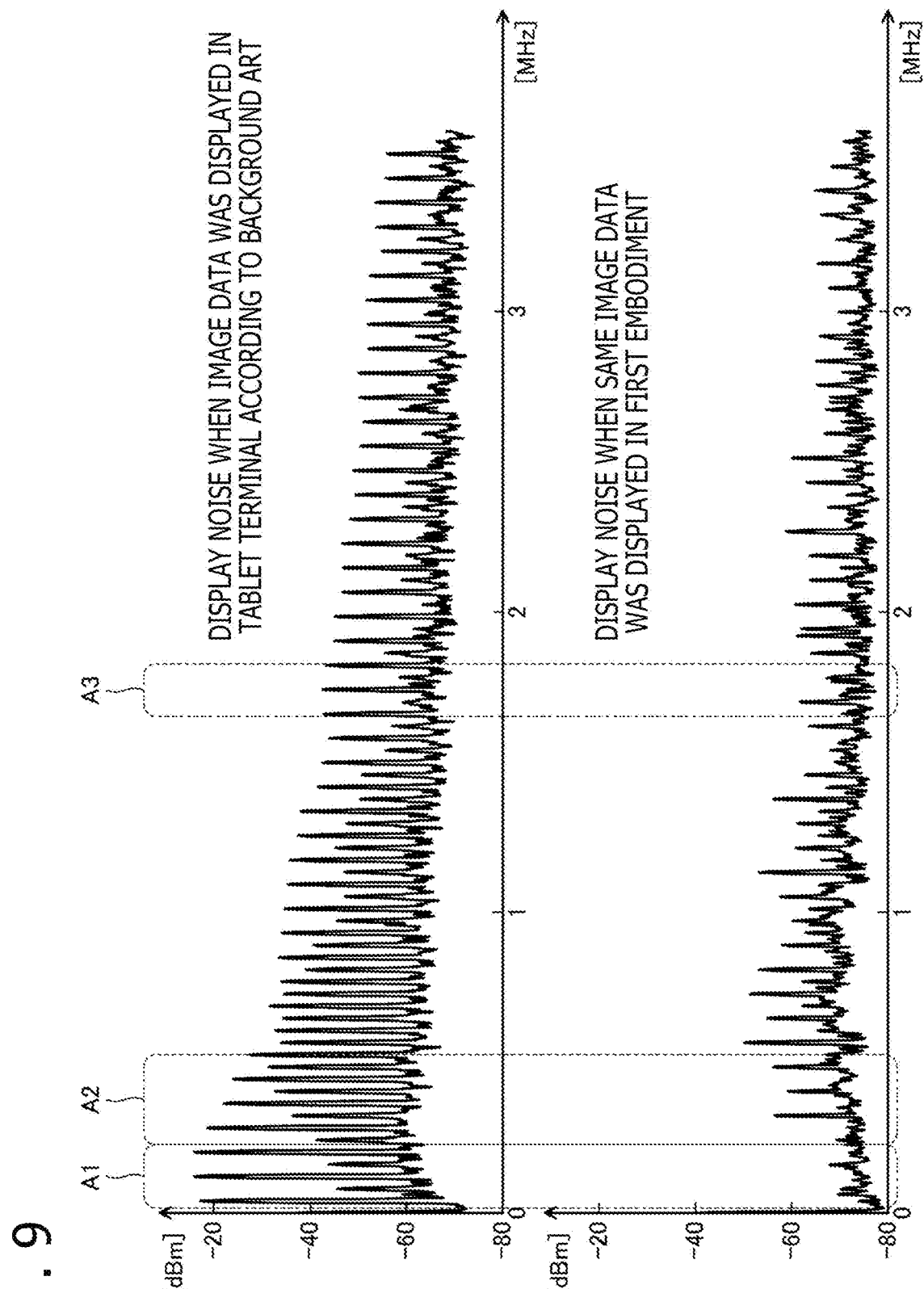
FIG. 9 is a diagram explaining an effect of the first embodiment of the present disclosure.

FIG. 9 is a diagram explaining an effect of the present embodiment. FIG. 9 depicts simulation results of the display noise when image data was displayed in the tablet terminal according to the background art (upper stage) and the display noise when the image data was displayed in the position detection system 1 according to the present embodiment (lower stage). The display noise depicted in FIG. 9 is, specifically, what resulted from simulating noise obtained when probing of the display surface of the display device 4 was carried out by a spectrum analyzer. Furthermore, in the simulation of this diagram, image data with which the display noise became the largest in the tablet terminal according to the background art was used.

The abscissa axis of FIG. 9 represents the frequency [MHz] and the ordinate axis represents the magnitude of noise [dBm]. Furthermore, frequency bands A1 to A3 depicted in FIG. 9 are each a frequency band used in signals (above-described beacon signal, burst signal, data signal, and so forth) transmitted and received between the stylus P1 and the touch sensor 30. Among them, the band A1 is used also in the above-described signal for finger detection.

As is understood from FIG. 9, according to the present embodiment, the display noise is suppressed compared with the background art in all of the frequency bands A1 to A3. Therefore, it can be said that at least frequency components that belong to the frequency bands used for communication between the stylus P1 and the touch sensor 30 are suppressed in the display noise. Accordingly, it can be said that, according to the present embodiment, it becomes possible to make communication operation of the stylus P1 and the touch sensor 30 be independent of driving operation of the pixel electrodes PE by the display device 4 and thereby avoid the deterioration of the quality of rendering processing based on data transmitted by the stylus P1. Furthermore, it can be said that it also becomes possible to avoid the quality deterioration of the rendering processing based on data transmitted by the stylus P1, such as failure in rendering due to malfunction of the stylus P1.

In the following, by taking two embodiment examples, the inversion pattern selection processing according to the present embodiment will be described in more detail.

Figure 10A:
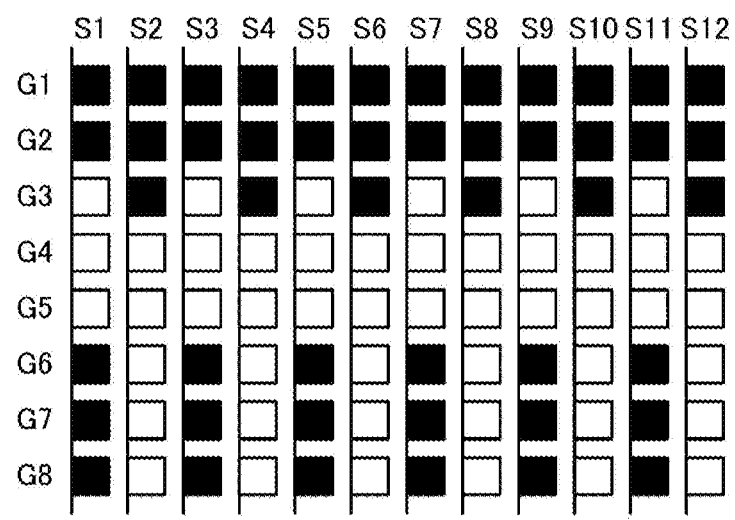
FIG. 10A is a diagram depicting image data according to a first example of the first embodiment of the present disclosure.
Figure 10B:
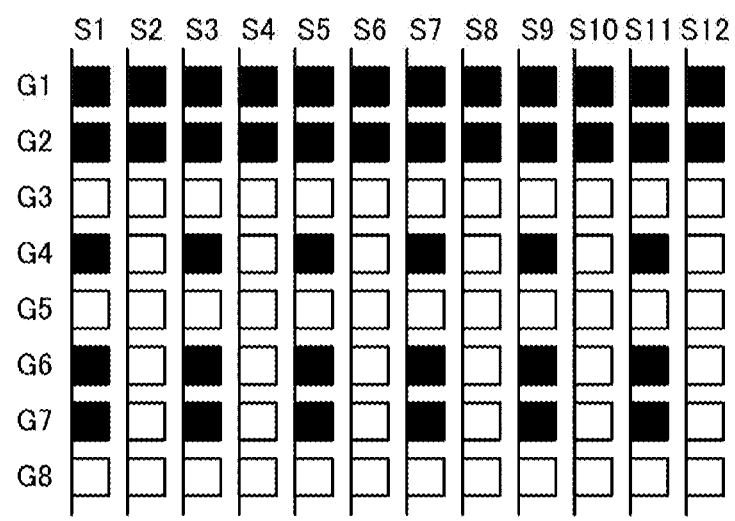
FIG. 10B is a diagram depicting image data according to a second example of the first embodiment of the present disclosure.

FIG. 10A is a diagram depicting image data according to a first embodiment example of the present embodiment and FIG. 10B is a diagram depicting image data according to a second embodiment example of the present embodiment.

FIGS. 11A, 11B, and 11C and FIG. 12 are diagrams explaining the inversion pattern selection processing in the case of using the first embodiment example depicted in FIG. 10A. FIGS. 11A, 11B, and 11C particularly depict scenes in which the inversion pattern H1+2Dot is selected in sequential selection of the inversion pattern for each gate line GL by the noise-and-flicker suppression processing circuit 51. Furthermore, the final result of the selection is depicted in FIG. 12.

FIG. 11A is a scene of selecting the inversion pattern for the gate line G3. The varying potential difference and the lighting quantity difference calculated in this scene are both 6. In response to this result, the noise-and-flicker suppression processing circuit 51 selects the inversion pattern H1+2Dot as the inversion pattern for the gate line G3. Thereby, the varying potential difference and the lighting quantity difference at the time of driving of the gate line G3 both change to 0 as depicted in FIG. 11B.

FIG. 11B is a scene of selecting the inversion pattern for the gate line G6. The varying potential difference and the lighting quantity difference calculated in this scene are both—6. In response to this result, the noise-and-flicker suppression processing circuit 51 selects the inversion pattern H1+2Dot as the inversion pattern for the gate line G6. Thereby, the varying potential difference and the lighting quantity difference at the time of driving of the gate line G6 both change to 0 as depicted in FIG. 11C.

FIG. 11C is a scene of selecting the inversion pattern for the gate line G7. The varying potential difference and the lighting quantity difference calculated in this scene are both—6. In response to this result, the noise-and-flicker suppression processing circuit 51 selects the inversion pattern H1+2Dot as the inversion pattern for the gate line G7. Thereby, the varying potential difference and the lighting quantity difference at the time of driving of the gate line G7 both change to 0 as depicted in FIG. 12.

As the result of the above selection, as depicted in FIG. 12, finally the inversion pattern H1Dot is used for the gate lines G1, G2, G4, G5, and G8 and the inversion pattern H1+2Dot is used for the gate lines G3, G6, and G7. This makes it possible to minimize the absolute value of each of the varying potential differences and the lighting quantity differences (in this case, set all absolute values to 0) as depicted in FIG. 12.

Figures 13A, 13B, 13C:
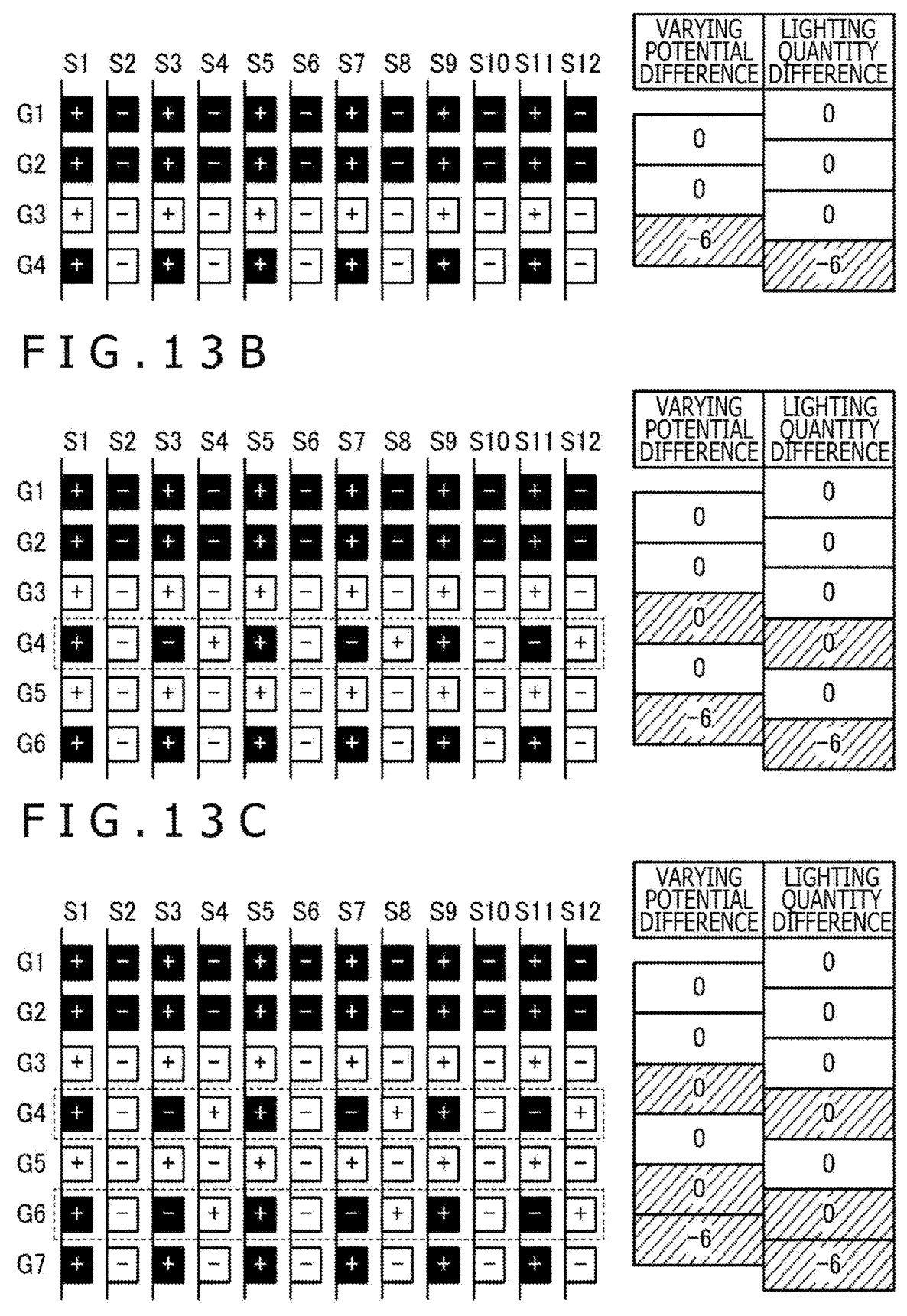

FIGS. 13A, 13B, and 13C and FIG. 14 are diagrams explaining the inversion pattern selection processing in the case of using the second embodiment example depicted in FIG. 10B. FIGS. 13A, 13B, and 13C particularly depicts scenes in which the inversion pattern H1+2Dot is selected in sequential selection of the inversion pattern for each gate line GL by the noise-and-flicker suppression processing circuit 51. Furthermore, the final result of the selection is depicted in FIG. 14.

FIG. 13A is a scene of selecting the inversion pattern for the gate line G4. The varying potential difference and the lighting quantity difference calculated in this scene are both—6. In response to this result, the noise-and-flicker suppression processing circuit 51 selects the inversion pattern H1+2Dot as the inversion pattern for the gate line G4. Thereby, the varying potential difference and the lighting quantity difference at the time of driving of the gate line G4 both change to 0 as depicted in FIG. 13B.

FIG. 13B is a scene of selecting the inversion pattern for the gate line G6. The varying potential difference and the lighting quantity difference calculated in this scene are both—6. In response to this result, the noise-and-flicker suppression processing circuit 51 selects the inversion pattern H1+2Dot as the inversion pattern for the gate line G6. Thereby, the varying potential difference and the lighting quantity difference at the time of driving of the gate line G6 both change to 0 as depicted in FIG. 13C.

FIG. 13C is a scene of selecting the inversion pattern for the gate line G7. The varying potential difference and the lighting quantity difference calculated in this scene are both—6. In response to this result, the noise-and-flicker suppression processing circuit 51 selects the inversion pattern H1+2Dot as the inversion pattern for the gate line G7. Thereby, the varying potential difference and the lighting quantity difference at the time of driving of the gate line G7 both change to 0 as depicted in FIG. 14.

As the result of the above selection, as depicted in FIG. 14, finally the inversion pattern H1Dot is used for the gate lines G1, G2, G3, G5, and G8 and the inversion pattern H1+2Dot is used for the gate lines G4, G6, and G7. This makes it possible to minimize the absolute value of each of the varying potential differences and the lighting quantity differences (in this case, set all absolute values to 0) as depicted in FIG. 14.

Next, a position detection system 1 according to a second embodiment of the present disclosure will be described.

Figure 15:
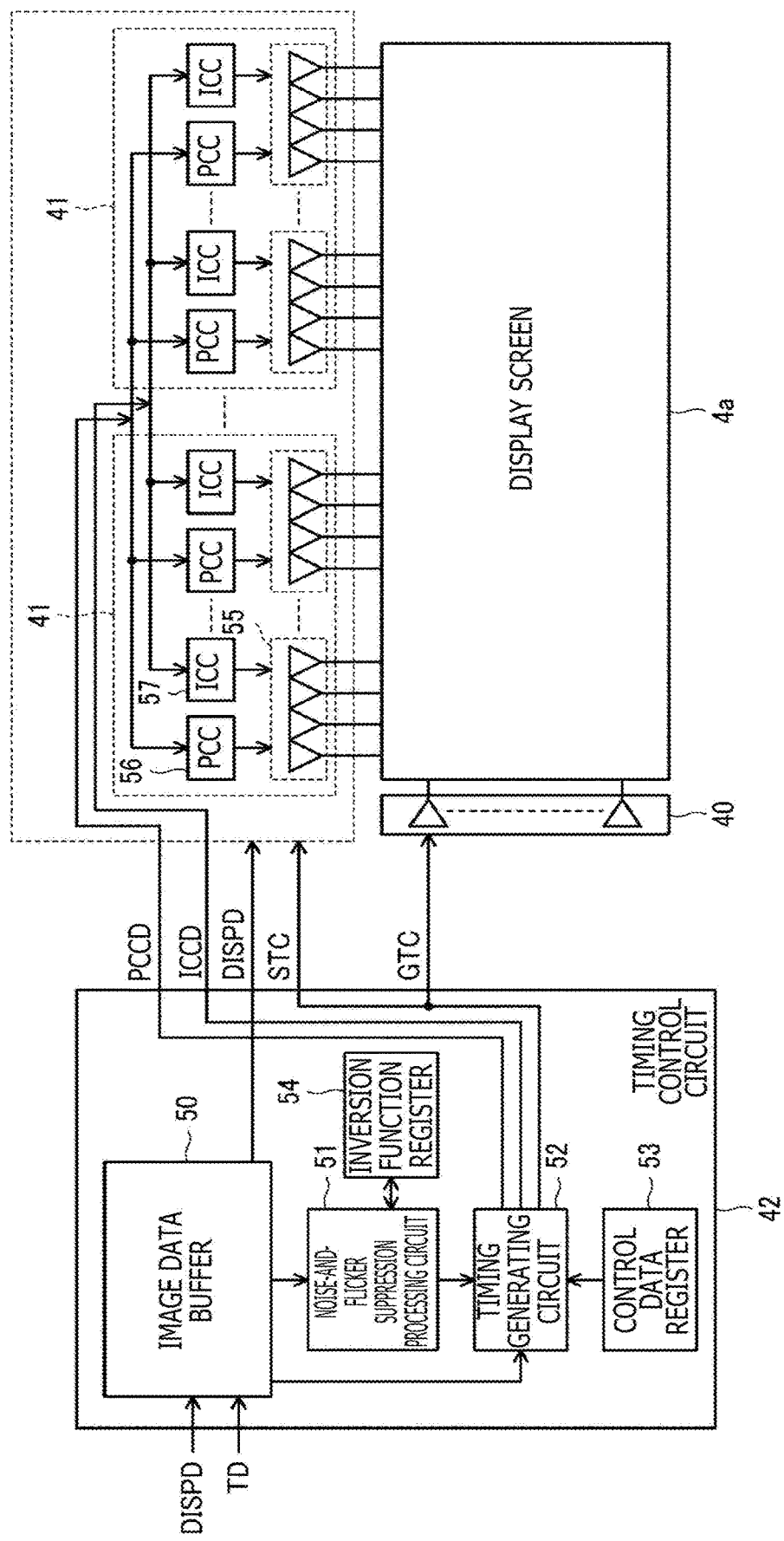
FIG. 15 is a diagram depicting the internal configuration of the timing control circuit and the source driver group according to a second embodiment of the present disclosure.

FIG. 15 is a diagram depicting the internal configuration of the timing control circuit 42 and the source driver group 41 according to the present embodiment. As is understood through comparison between FIG. 15 and FIG. 3, the position detection system 1 according to the present embodiment is different from the position detection system 1 according to the first embodiment in that the position detection system 1 according to the present embodiment has an inversion function register 54 in the timing control circuit 42. The position detection system 1 according to the present embodiment is the same as the position detection system 1 according to the first embodiment in the other points. Therefore, in the following, description will be made with focus on the difference from the first embodiment.

The inversion function register 54 is a storing device configured to be capable of storing the selection result of the inversion pattern by the noise-and-flicker suppression processing circuit 51 for one frame. The noise-and-flicker suppression processing circuit 51 according to the present embodiment is configured to write the inversion pattern selected by the inversion pattern selection processing (S3) depicted in FIG. 5 to the inversion function register 54.

FIG. 16 is a diagram depicting stored contents of the inversion function register 54. As depicted in FIG. 16, in the inversion function register 54, the inversion pattern (inversion pattern H1Dot or inversion pattern H1+2Dot) is stored regarding each gate line GL.

Figure 17:
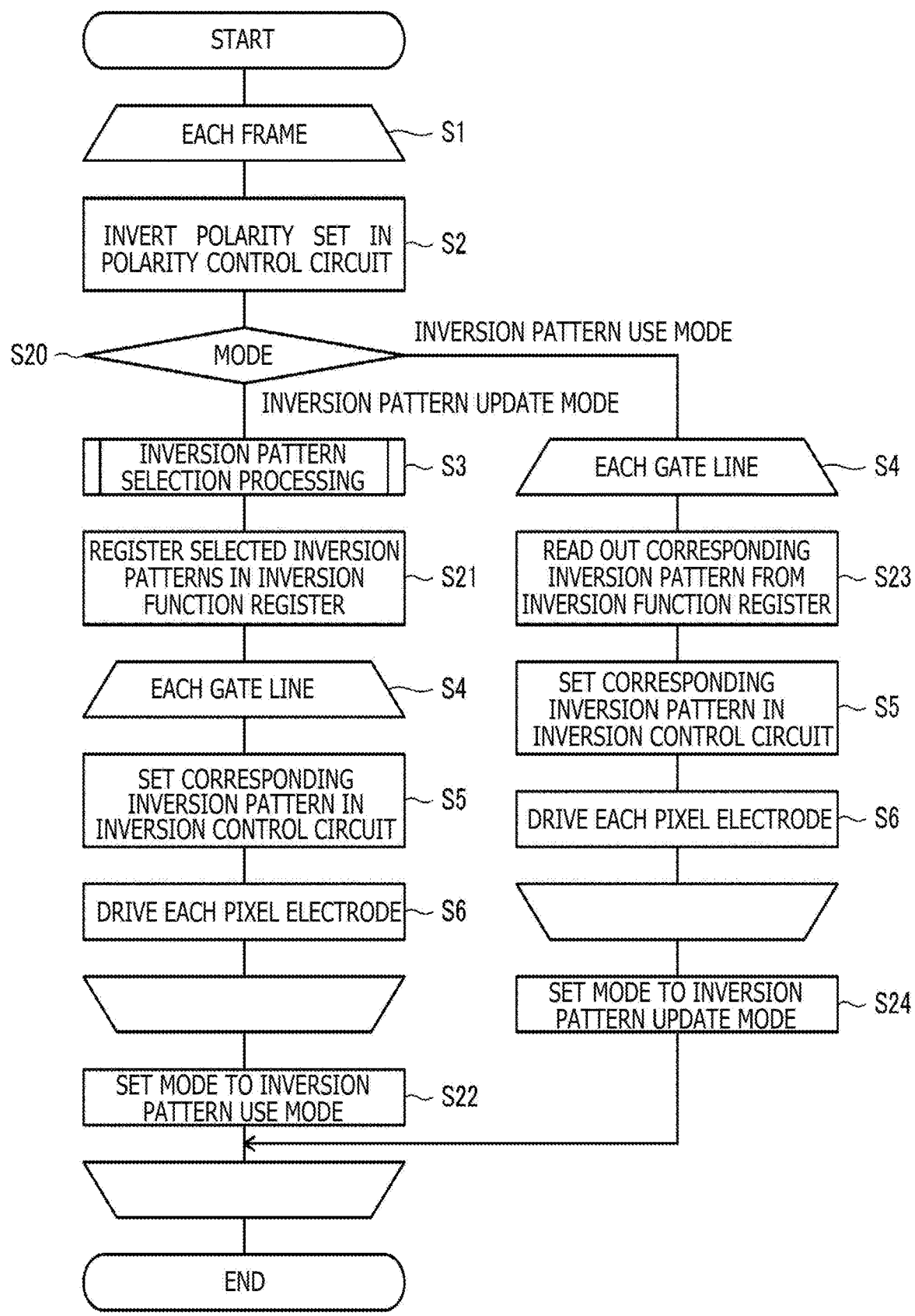
FIG. 17 is a flowchart of processing performed by the timing control circuit 42 according to the second embodiment of the present disclosure.

FIG. 17 is a flowchart depicting processing performed by the timing control circuit 42 according to the present embodiment. The same act as described in FIG. 5 is given the same numeral and description will be made with focus on differences from FIG. 5 in the following.

After carrying out S2, the timing control circuit 42 according to the present embodiment determines whether its own mode set at S22 or S24 to be described later is an inversion pattern update mode or an inversion pattern use mode (S20). The inversion pattern update mode is a mode in which the inversion patterns used for driving of each pixel electrode PE are newly selected and are written to the inversion function register 54. The inversion pattern use mode is a mode in which each pixel electrode PE is driven by using the inversion patterns stored in the inversion function register 54. Although not depicted in the diagram, it is preferable to set the initial value to the inversion pattern update mode.

The timing control circuit 42 that has determined that its own mode is the inversion pattern update mode in the S20 performs the inversion pattern selection processing depicted in FIG. 8 (S3) and registers the inversion patterns selected as the result thereof in the inversion function register 54 (S21). Then, similarly to the case of FIG. 5, setting of the inversion pattern in each inversion control circuit 57 and driving of each pixel electrode PE are carried out regarding each gate line GL sequentially (S4 to S6). After the processing about all gate lines GL ends, the timing control circuit 42 sets its own mode to the inversion pattern use mode (S22) and returns to S2.

The timing control circuit 42 when it has determined that its own mode is the inversion pattern use mode at S12 carries out setting of the inversion pattern in each inversion control circuit 57 and driving of each pixel electrode PE regarding each gate line GL sequentially similarly to the case of FIG. 5 without performing the inversion pattern selection processing (S4 to S6). However, before carrying out S5, the timing control circuit 42 performs processing of reading out the corresponding inversion pattern from the inversion function register 54 (S23). Then, the timing control circuit 42 uses the read-out inversion pattern as the inversion pattern set in each inversion control circuit 57 at S5. After the processing about all gate lines GL ends, the timing control circuit 42 sets its own mode to the inversion pattern update mode (S24) and returns to S2.

According to the present embodiment, it suffices for the noise-and-flicker suppression processing circuit 51 to perform the inversion pattern selection processing only one time per two frames. In the inversion pattern use mode, there is also a possibility that the inversion pattern improper in terms of the contents of image data is used and the lowering of the image quality occurs. However, there is hardly an opportunity for large change in the contents of image data between two frames. Thus, it can be said that actually the lowering of the image quality hardly occurs even in the processing of the present embodiment. Therefore, according to the present embodiment, the amount of processing of the display device 4 can be reduced without the lowering of the image quality substantially. This makes it possible to reduce the power consumption of the position detection system 1.

Next, a position detection system 1 according to a third embodiment of the present disclosure will be described.

Figures 18A, 18B:
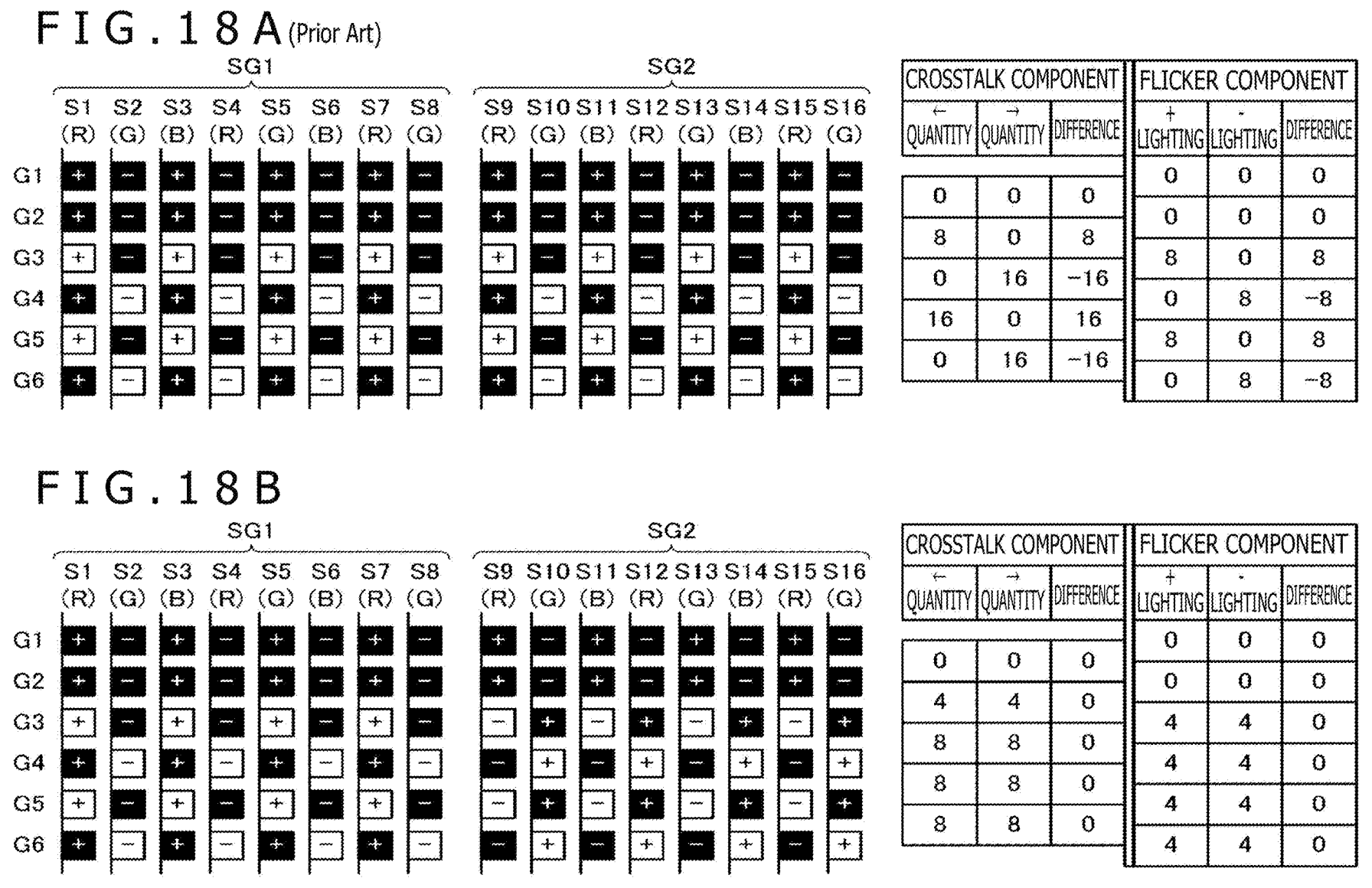

FIG. 18A is a diagram explaining the driving method of the pixel electrodes PE based on the background art of the present disclosure. FIG. 18B is a diagram explaining the driving method of the pixel electrodes PE in the case of displaying the same image data as FIG. 18A based on the present embodiment. The position detection system 1 according to the present embodiment is different from the position detection system 1 according to the first embodiment in that the position detection system 1 according to the present embodiment carries out suppression of the display noise and flicker by changing not the inversion pattern set in the inversion control circuit 57 but the polarity set in the polarity control circuits 56 for each source group 55 (see FIG. 3). The inversion pattern set in the inversion control circuits 57 is fixed to the inversion pattern H1Dot. The position detection system 1 according to the present embodiment is the same as the position detection system 1 according to the first embodiment in the other points. Therefore, in the following, description will be made with focus on the difference from the first embodiment.

The noise-and-flicker suppression processing circuit 51 according to the present embodiment is configured to carry out suppression control of the display noise and flicker by controlling the driving method of the pixel electrodes PE according to the contents of the image data DISPD for each of the combinations of the gate line GL and the source group 55. Specifically, the noise-and-flicker suppression processing circuit 51 is configured to control the driving method of the pixel electrodes PE by performing polarity selection processing of selecting the polarity set in the polarity control circuit 56 in circuits of source group 55. This selection is also carried out in circuits of gate line GL.

With reference to FIGS. 18A and 18B, the outline of the polarity selection processing by the noise-and-flicker suppression processing circuit 51 according to the present embodiment will be described below. In FIGS. 18A and 18B, two source groups SG1 and SG2 that are each the source group 55 depicted in FIG. 3 are depicted. Although actually more source groups 55 can exist, here the description will be continued with focus on the two source groups SG1 and SG2 for simplification of explanation.

In the case of causing the image data DISPD depicted in FIG. 18A to be displayed on the tablet terminal according to the background art, the absolute value of the varying potential difference and the absolute value of the lighting quantity difference both become a large value in the gate lines G3 to G6 as depicted in FIG. 18A. So, the noise-and-flicker suppression processing circuit 51 inverts the polarity set in the polarity control circuit 56 of the source group SG2 for the gate lines G3 to G6 as depicted in FIG. 18B. The polarity set in the polarity control circuit 56 of the source group SG1 is not inverted. Thereby, as depicted in FIG. 18B, the varying potential difference and the lighting quantity difference in the gate lines G3 to G6 both become 0 and the occurrence of the display noise and flicker is suppressed.

Figure 19:
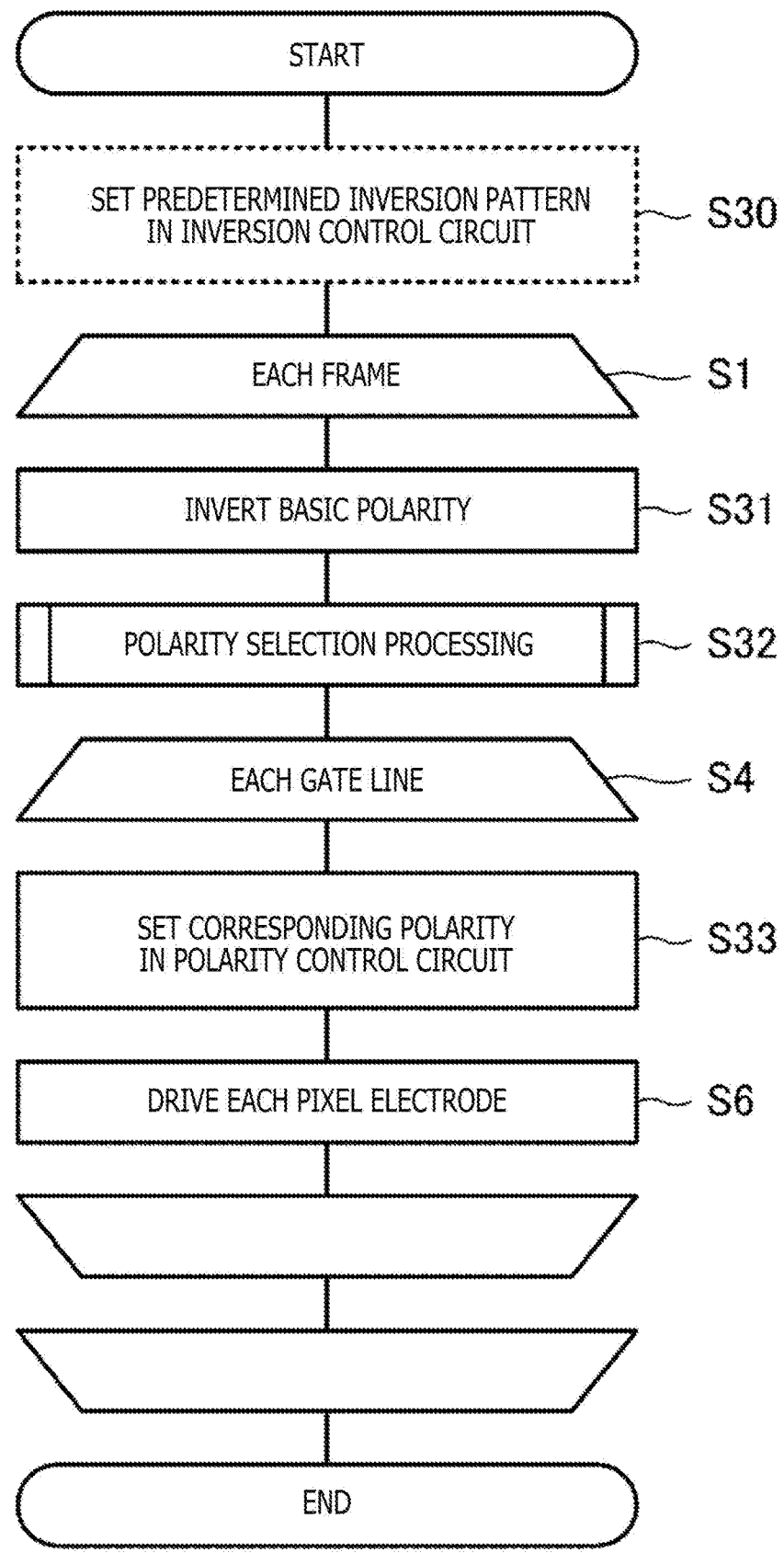
FIG. 19 is a flowchart of processing performed by the timing control circuit according to the third embodiment of the present disclosure.

FIG. 19 is a flowchart of processing performed by the timing control circuit 42 according to the present embodiment. The same act as in FIG. 5 is given the same numeral and description will be made with focus on differences from FIG. 5 in the following.

The timing control circuit 42 according to the present embodiment performs processing of setting a predetermined inversion pattern in each inversion control circuit 57 as pre-processing (S30) and thereafter performs processing of S1 and the subsequent acts. The inversion pattern set at S30 may be the inversion pattern H1Dot or may be the inversion pattern H1+2Dot or may be another inversion pattern.

In the processing for each frame, the timing control circuit 42 performs the respective kinds of processing of S31, S32, and S33 instead of the respective kinds of processing of S2, S3, and S5 depicted in FIG. 5.

The processing of S31 is processing of inverting basic polarity to which reference is made in the polarity selection processing performed in the S32 to be described later. Specifically, if the present basic polarity is the plus polarity, the minus polarity is set as the basic polarity. If the present basic polarity is the minus polarity, the plus polarity is set as the basic polarity. The initial value of the basic polarity may be either the plus polarity or the minus polarity.

The processing of S32 is the polarity selection processing for deciding the polarity set in the polarity control circuit 56 for each of the combinations of the gate line GL and the source group 55. Details of the polarity selection processing will be described later with reference to FIG. 20.

The processing of S33 is processing of setting, in each polarity control circuit 56, the polarity selected regarding the corresponding gate line GL by the polarity selection processing of S32. The timing control circuit 42 according to the present embodiment carries out driving operation of each pixel electrode PE by using the polarity thus set (S6).

Figure 20:
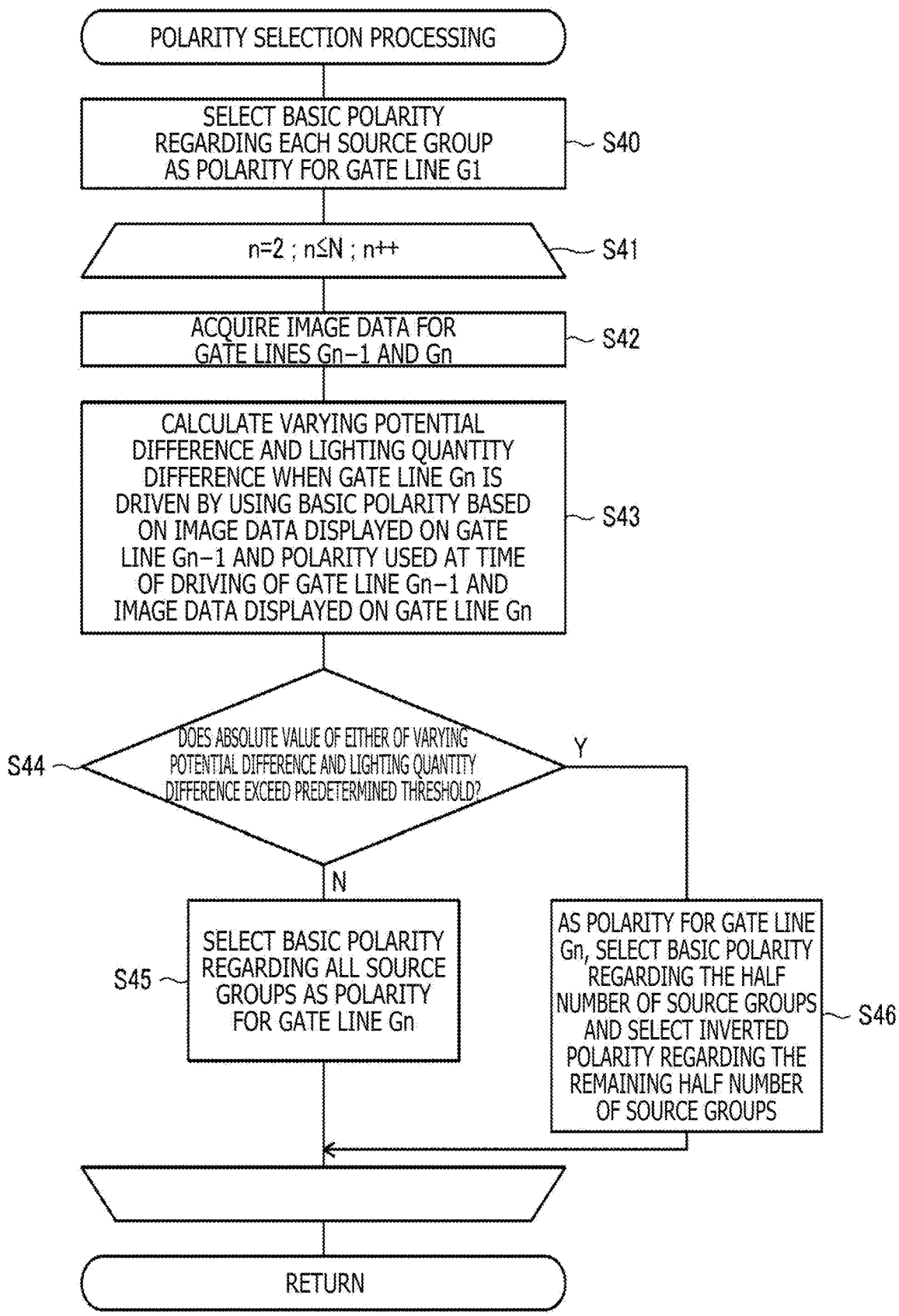
FIG. 20 is a flowchart of polarity selection processing depicted in FIG. 19.

FIG. 20 is a flowchart of the polarity selection processing performed at S32. As depicted in FIG. 20, first the noise-and-flicker suppression processing circuit 51 selects the basic polarity regarding each source group 55 as the polarity for the gate line G1 (S40). The basic polarity is the polarity set in the S31 in FIG. 19.

Next, the noise-and-flicker suppression processing circuit 51 performs processing of S42 to S46 regarding each of the gate lines G2 to GN (S41).

In the processing of S42 to S46, first the noise-and-flicker suppression processing circuit 51 performs processing similar to S12 and S13 depicted in FIG. 8 to calculate the varying potential difference and the lighting quantity difference (S42 and S43). However, the varying potential difference and the lighting quantity difference calculated in this case are those when the gate line Gn is driven by using the basic polarity.

Subsequently, the noise-and-flicker suppression processing circuit 51 carries out determination of whether or not the absolute value of any of the calculated varying potential difference and lighting quantity difference exceeds a predetermined threshold (S44). Then, when determining that the absolute value does not exceed the threshold, the noise-and-flicker suppression processing circuit 51 selects the basic polarity regarding all source groups 55 as the polarity for the gate line Gn (S45). On the other hand, when determining that the absolute value exceeds the threshold, as the polarity for the gate line Gn, the noise-and-flicker suppression processing circuit 51 selects the basic polarity regarding the half number of source groups 55 decided in advance and selects the inverted polarity obtained by inverting the basic polarity regarding the remaining half number of source groups 55 (S46). Although the inverted polarity is allocated to the half number of source groups 55, the source groups 55 to which the inverted polarity is allocated may be decided by another method. For example, the source groups 55 to which the inverted polarity is allocated may be decided according to the position in the display surface regarding the plural pixels P corresponding to the respective source groups 55.

The noise-and-flicker suppression processing circuit 51 selects the polarity for each source group 55 in the above-described manner and sets the selected polarity in the polarity control circuit 56 of each source group 55. This makes it possible to suppress the varying potential difference and the lighting quantity difference to a value equal to or smaller than the above-described predetermined threshold regarding substantially all pieces of image data DISPD. Therefore, it becomes possible to suppress at least frequency components that belong to the frequency bands used for communication between the stylus P1 and the touch sensor 30 in the display noise. Thus, similarly to the first embodiment, it becomes possible to make communication operation of the stylus P1 and the touch sensor 30 be independent of driving operation of the pixel electrodes PE by the display device 4 and thereby avoid the deterioration of the quality of rendering processing based on data transmitted by the stylus P1. Furthermore, it also becomes possible to suppress flicker. Moreover, it also becomes possible to avoid the quality deterioration of the rendering processing based on data transmitted by the stylus P1, such as failure in rendering due to malfunction of the stylus P1.

If the first embodiment can be used, it is preferable to carry out suppression of the display noise and flicker by using not the third embodiment but the first embodiment. Specifically, in the first embodiment, the voltage vibration that occurs in the common potential line CL is canceled out between adjacent source lines SL. However, according to the third embodiment, the voltage vibration that occurs in the common potential line CL is canceled out between separate regions in the display surface. Therefore, according to the third embodiment, possibly the effect of canceling out the voltage vibration becomes slightly weaker compared with the first embodiment. Thus, if the first embodiment can be used, it is preferable to use not the third embodiment but the first embodiment.

Furthermore, in FIG. 20, the polarity for the gate line G1 is fixed to the basic polarity. However, the noise-and-flicker suppression processing circuit 51 may deem also the polarity for the gate line G1 as the target of the selection processing. However, in this case, calculation is impossible about the varying potential difference and therefore it is preferable to perform processing similar to S44 to S46 based on only the lighting quantity difference. Alternatively, the gate line GN employed as the target of the processing last in the previous frame may be used as the gate line Gn−1 to perform the processing of S42 to S46.

In the following, by taking one embodiment example, the polarity selection processing according to the present embodiment will be described in more detail.

Figure 21:
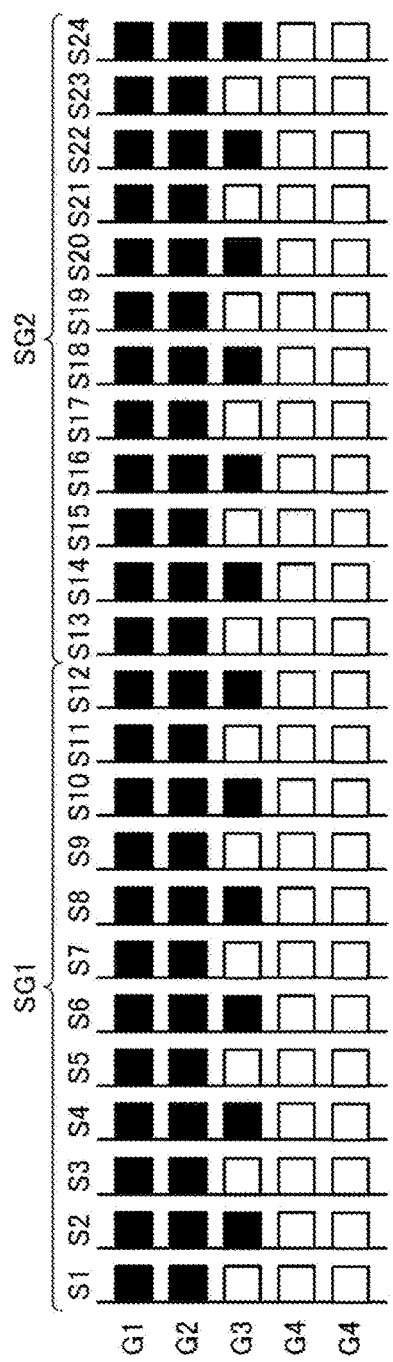
FIG. 21 is a diagram depicting image data according to an example of the third embodiment of the present disclosure.
Figure 22:
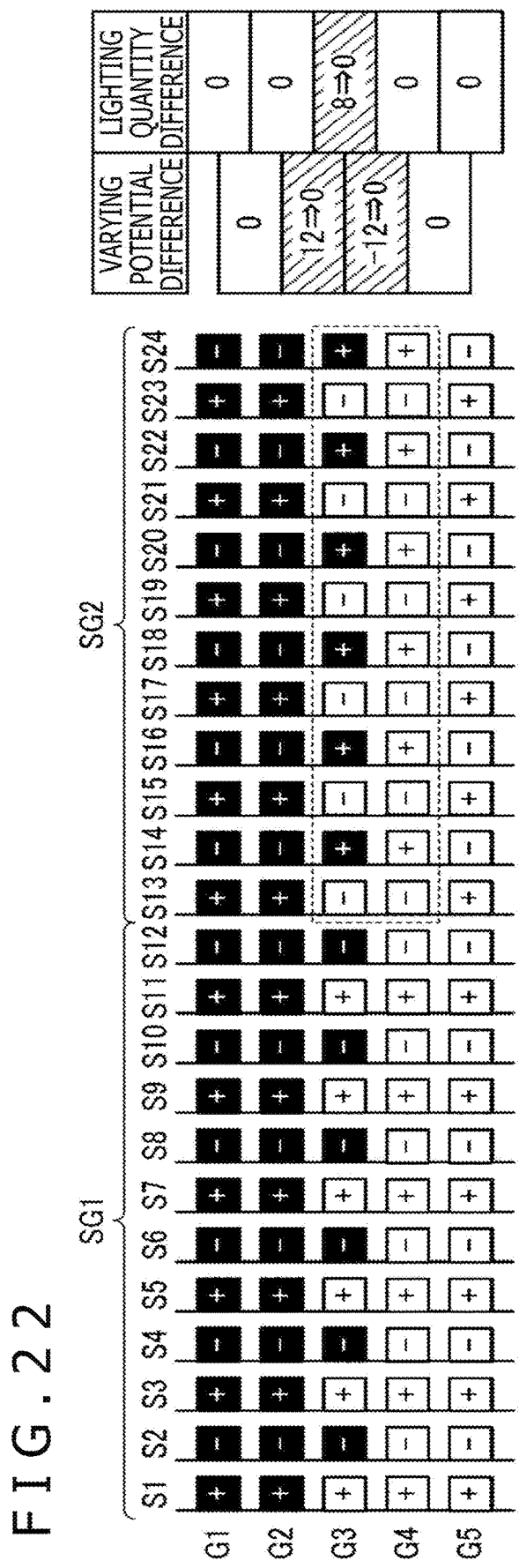
FIG. 22 is a diagram explaining polarity selection processing in a case of using the example depicted in FIG. 21.

FIG. 21 is a diagram depicting image data according to the embodiment example of the present embodiment. Furthermore, FIG. 22 is a diagram explaining the polarity selection processing in the case of using the embodiment example depicted in FIG. 21. The final result of the selection is depicted in FIG. 22.

As depicted in FIG. 22, when the varying potential difference and the lighting quantity difference of the image data DISPD depicted in FIG. 21 are calculated without performing the polarity selection processing according to the present embodiment, the absolute value of the varying potential difference becomes 12 at the time of driving of the gate lines G3 and G4. Furthermore, the absolute value of the lighting quantity difference becomes 8 at the time of driving of the gate line G3. In response to this result, as the polarity for the gate lines G3 and G4, the noise-and-flicker suppression processing circuit 51 selects the non-inverted polarity regarding the source group SG1 and selects the inverted polarity regarding the source group SG2 including the remaining half number of source lines. This implements setting all of the varying potential difference at the time of driving of the gate lines G3 and G4 and the lighting quantity difference at the time of driving of the gate line G3 to 0. Therefore, the display noise and flicker are suppressed.

Next, a position detection system 1 according to a fourth embodiment of the present disclosure will be described.

The position detection system 1 according to the present embodiment is different from the position detection system 1 according to the third embodiment in that the timing control circuit 42 has the same internal configuration as that of the second embodiment depicted in FIG. 15 (that is, in that the inversion function register 54 is disposed in the timing control circuit 42). The position detection system 1 according to the present embodiment is the same as the position detection system 1 according to the third embodiment in the other points. Therefore, in the following, description will be made with focus on the difference from the third embodiment.

The inversion function register 54 according to the present embodiment is a memory device configured to be capable of storing the selection result of the polarity by the noise-and-flicker suppression processing circuit 51 for one frame. The noise-and-flicker suppression processing circuit 51 is configured to write the polarity of each source group 55 selected by the polarity selection processing (S32) depicted in FIG. 19 to the inversion function register 54.

FIG. 23 is a diagram depicting stored contents of the inversion function register 54 according to the present embodiment. As depicted in FIG. 23, in the inversion function register 54, the polarity (basic polarity or inverted polarity) set in each source group 55 is stored regarding each gate line GL.

Figure 24:
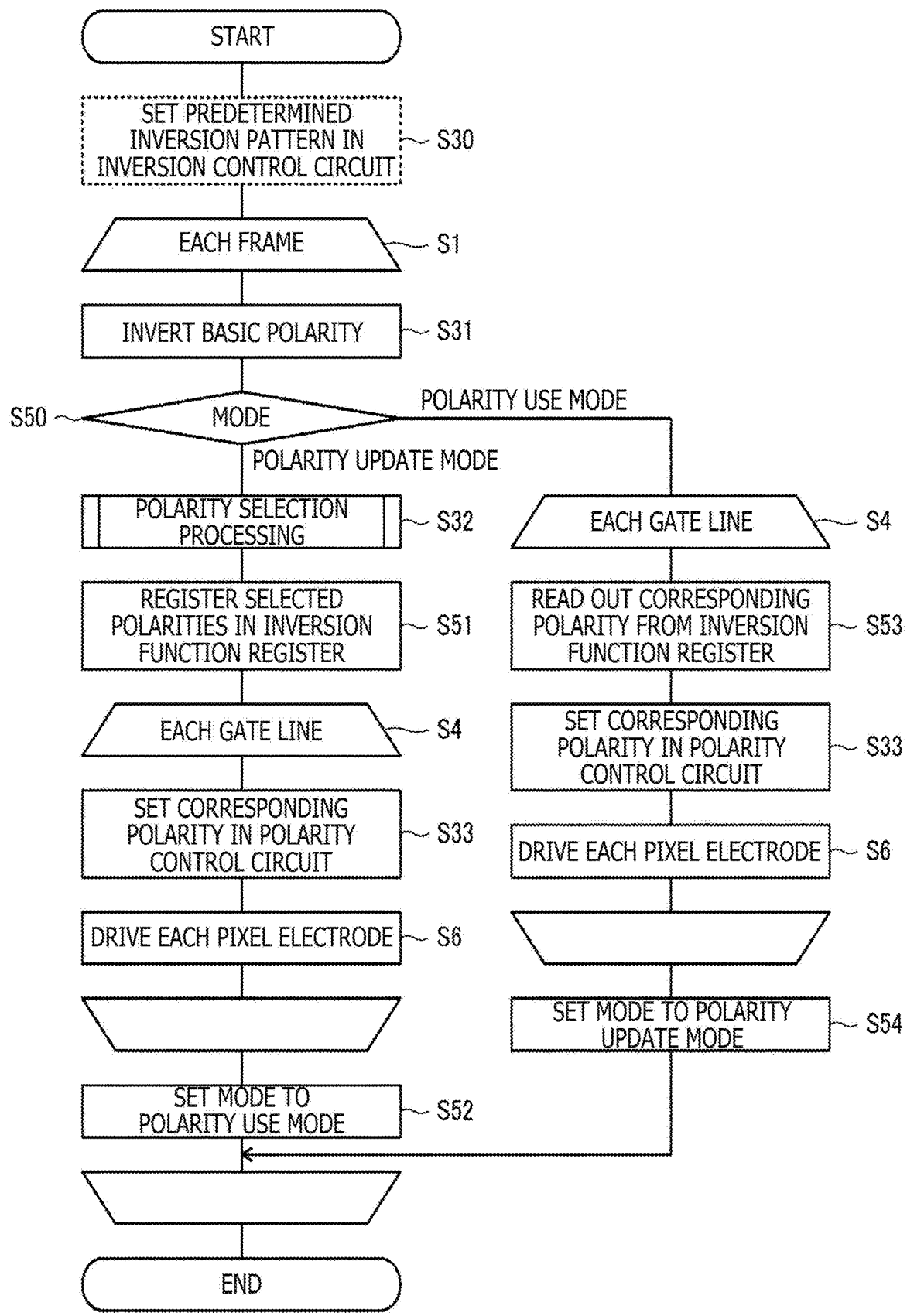
FIG. 24 is a flowchart of processing performed by the timing control circuit according to the fourth embodiment of the present disclosure.

FIG. 24 is a flowchart depicting processing performed by the timing control circuit 42 according to the present embodiment. The same act as FIG. 19 is given the same numeral and description will be made with focus on differences from FIG. 19 in the following.

After carrying out S31, the timing control circuit 42 according to the present embodiment determines whether its own mode set at S52 or S54 to be described later is a polarity update mode or a polarity use mode (S50). The polarity update mode is a mode in which the polarities used for driving of each pixel electrode PE are newly selected and are written to the inversion function register 54. The polarity use mode is a mode in which each pixel electrode PE is driven by using the polarities stored in the inversion function register 54. Although not depicted in the diagram, it is preferable to set the initial value to the polarity update mode.

The timing control circuit 42 that has determined that its own mode is the polarity update mode at S50 first performs the polarity selection processing depicted in FIG. 20 (S32) and registers the polarities selected as the result thereof in the inversion function register 54 (S51). Then, similarly to the case of FIG. 19, setting of the polarity in each polarity control circuit 56 and driving of each pixel electrode PE are carried out regarding each gate line GL sequentially (S4, S33, and S6). After the processing about all gate lines GL ends, the timing control circuit 42 sets its own mode to the polarity use mode (S52) and returns to S31.

The timing control circuit 42 when it has determined that its own mode is the polarity use mode at S50 carries out setting of the polarity in each polarity control circuit 56 and driving of each pixel electrode PE regarding each gate line GL sequentially similarly to the case of FIG. 19 without performing the polarity selection processing (S4, S33, and S6). However, before carrying out S33, the timing control circuit 42 performs processing of reading out the corresponding polarity from the inversion function register 54 (S53). Then, the timing control circuit 42 uses the read-out polarity as the polarity set in each polarity control circuit 56 at S33. After the processing about all gate lines GL ends, the timing control circuit 42 sets its own mode to the polarity update mode (S54) and returns to S31.

According to the present embodiment, it suffices for the noise-and-flicker suppression processing circuit 51 to perform the polarity selection processing only one time per two frames. In the polarity use mode, there is also a possibility that the polarity improper in terms of the contents of image data is used and the lowering of the image quality occurs. However, there is hardly an opportunity for large change in the contents of image data between two frames. Thus, it can be said that actually the lowering of the image quality hardly occurs even in the processing of the present embodiment. Therefore, according to the present embodiment, the amount of processing of the display device 4 can be reduced without the lowering of the image quality substantially similarly to the second embodiment. This makes it possible to reduce the power consumption of the position detection system 1.

Next, a position detection system 1 according to a fifth embodiment of the present disclosure will be described.

The position detection system 1 according to the present embodiment is different from the position detection system 1 according to the first embodiment in that the position detection system 1 according to the present embodiment suppresses the display noise and flicker by not changing the set contents of the polarity control circuits 56 or the inversion control circuits 57 but decreasing the change rate of the video signal Vsig generated by the source driver SD. The position detection system 1 according to the present embodiment is the same as the position detection system 1 according to the first embodiment in the other points. Therefore, in the following, description will be made with focus on the difference from the first embodiment.

The internal configurations of the timing control circuit 42 and the source driver group 41 according to the present embodiment are the same as those of the first embodiment depicted in FIG. 3. When the absolute value of any of the varying potential difference and the lighting quantity difference calculated regarding a certain gate line GL exceeds a predetermined threshold, the timing control circuit 42 according to the present embodiment controls each source driver SD to generate the video signal Vsig whose change rate is set lower compared with the normal video signal Vsig generated by the source driver SD at the time of driving of the gate line GL.

Figure 25:
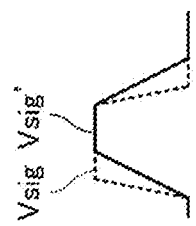
FIG. 25 is a diagram depicting a video signal according to a fifth embodiment of the present disclosure.

FIG. 25 is a diagram depicting an example of the video signal Vsig according to the present embodiment. A video signal Vsig' depicted by a solid line represents a signal whose change rate is set lower than the normal video signal Vsig depicted by a dashed line. A voltage variation that appears in the common potential line CL in association with driving of the pixel electrode PE can be suppressed by using the video signal Vsig'. Therefore, similarly to the first to fourth embodiments, it becomes possible to suppress at least frequency components that belong to the frequency bands used for communication between the stylus P1 and the touch sensor 30 in the display noise. Thus, it becomes possible to make communication operation of the stylus P1 and the touch sensor 30 be independent of driving operation of the pixel electrodes PE by the display device 4 and thereby avoid the deterioration of the rendering quality. Furthermore, it also becomes possible to avoid the quality deterioration of rendering processing based on data transmitted by the stylus P1, such as failure in rendering due to malfunction of the stylus P1.

Figure 26:
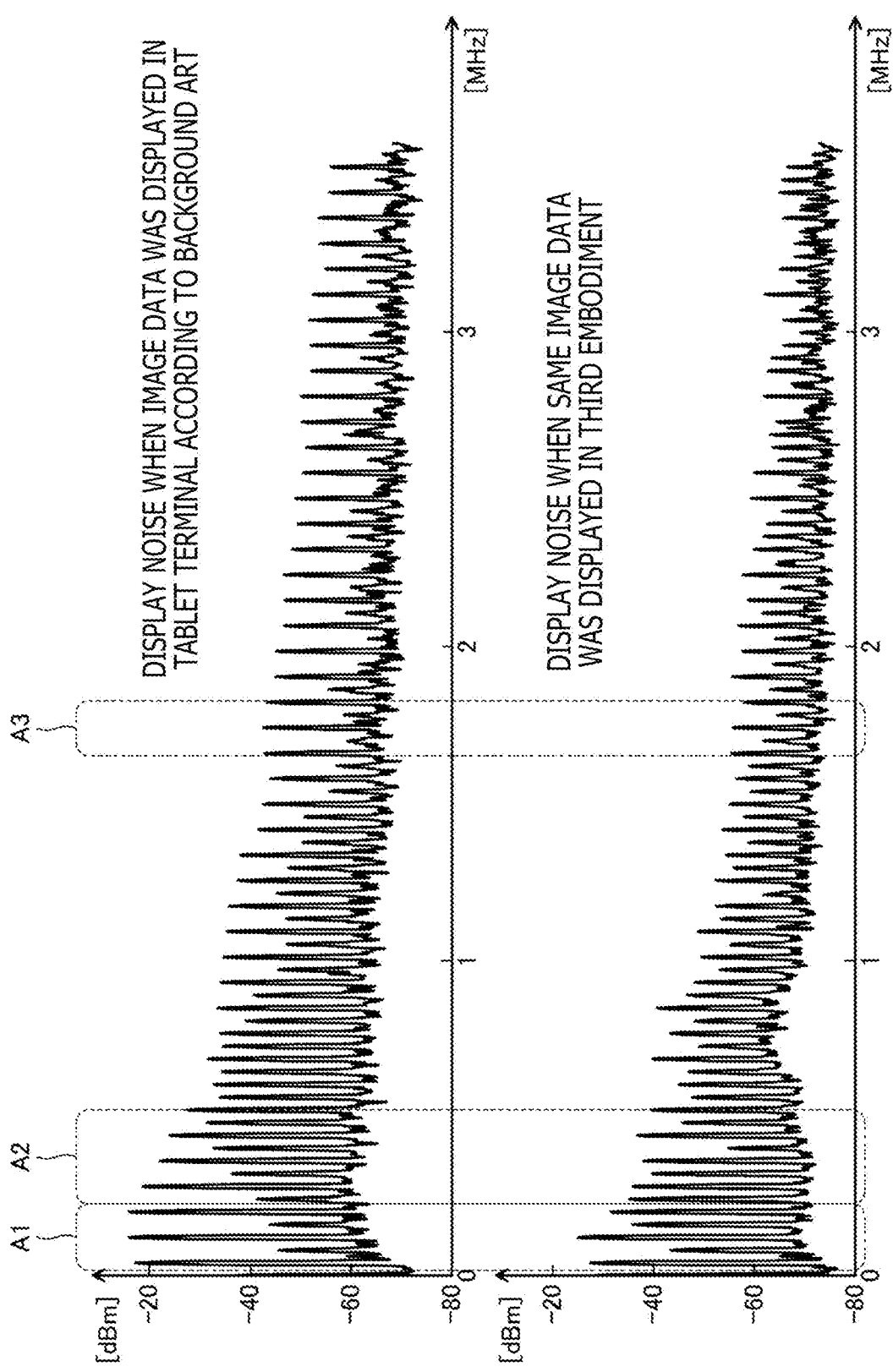
FIG. 26 is a diagram explaining an effect of the fifth embodiment of the present disclosure.

FIG. 26 is a diagram explaining an effect of the present embodiment. Similar to FIG. 9, FIG. 26 depicts simulation results of the display noise when image data was displayed in the tablet terminal according to the background art (upper stage) and the display noise when the image data was displayed in the position detection system 1 according to the present embodiment (lower stage). The change rate of the video signal Vsig was set to ⅖ of the change rate in the background art. The other simulation conditions, the meanings of the abscissa axis and the ordinate axis, and the meanings of the frequency bands A1 to A3 depicted in the diagram are the same as FIG. 9.

As is understood from FIG. 26, also according to the present embodiment, the display noise is suppressed compared with the background art in all of the frequency bands A1 to A3. Therefore, it can be said that at least frequency components that belong to the frequency bands used for communication between the stylus P1 and the touch sensor 30 are suppressed in the display noise. Thus, according to the present embodiment, it becomes possible to make communication operation of the stylus P1 and the touch sensor 30 be independent of driving operation of the pixel electrodes PE by the display device 4 and thereby avoid the deterioration of the quality of rendering processing based on data transmitted by the stylus P1. Furthermore, it also becomes possible to avoid the quality deterioration of the rendering processing based on data transmitted by the stylus P1, such as failure in rendering due to malfunction of the stylus P1.

Also in the present embodiment, the timing control circuit 42 may select which of the video signals Vsig and Vsig' is used only one time per two frames by using the inversion function register 54 similarly to the second and fourth embodiments. In this case, information depicting the change rate of the video signal Vsig is stored in the inversion function register 54 regarding each gate line GL. This can reduce the amount of processing of the display device 4 without the lowering of the image quality substantially similarly to the second embodiment. This makes it possible to reduce the power consumption of the position detection system 1.

Next, a position detection system 1 according to a sixth embodiment of the present disclosure will be described.

The position detection system 1 according to the present embodiment is different from the position detection systems 1 according to the first to fifth embodiments in that the position detection system 1 according to the present embodiment is configured to be capable of selectively operating in either of a mode in which the plural pixel electrodes PE are driven with the noise suppression control (and flicker suppression control) like that described in the first to fifth embodiments (first operation mode) and a mode in which the plural pixel electrodes PE are driven without the noise suppression control (second operation mode). The position detection system 1 according to the present embodiment is the same as the position detection systems 1 according to the first to fifth embodiments in the other points. Therefore, in the following, description will be made with focus on the difference from the first embodiment.

Figure 27:
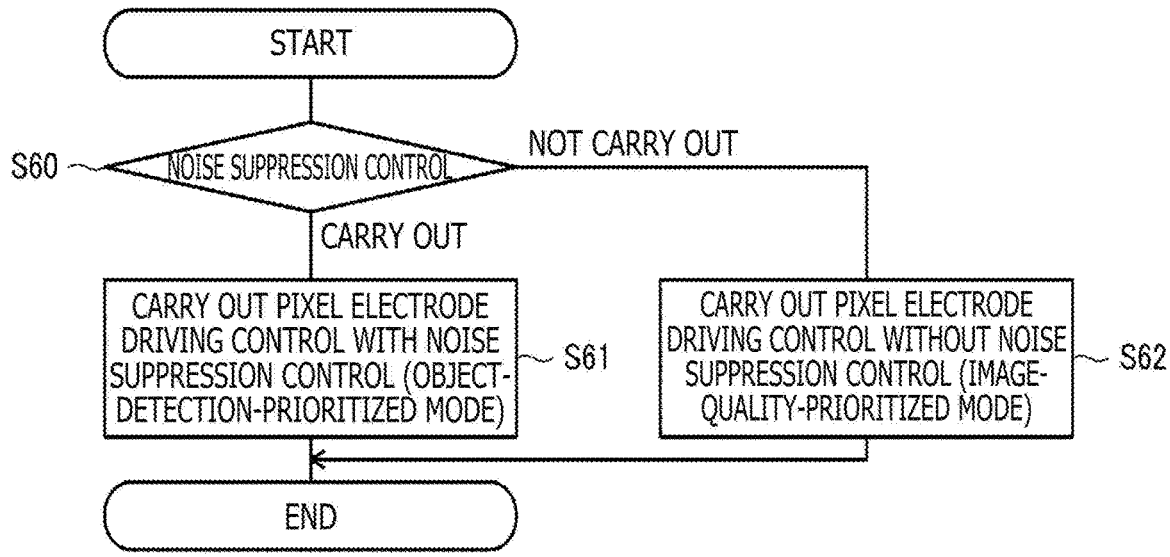
FIG. 27 is a flowchart of processing performed by the timing control circuit according to a sixth embodiment of the present disclosure.

FIG. 27 is a flowchart of processing performed by the timing control circuit 42 according to the present embodiment. As depicted in FIG. 27, first the timing control circuit 42 according to the present embodiment determines whether or not to carry out the noise suppression control (and flicker suppression control) (S60). Then, when determining to carry out the noise suppression control, the timing control circuit 42 carries out pixel electrode driving control with the noise suppression control (S61). Specifically, the timing control circuit 42 carries out driving control of each pixel electrode PE by the method described in the first to fifth embodiments. On the other hand, when determining not to carry out the noise suppression control, the timing control circuit 42 carries out the pixel electrode driving control without the noise suppression control (S62). That is, the timing control circuit 42 carries out driving control of each pixel electrode PE based on the background art.

It is preferable that the determination of S60 be carried out in response to a predetermined input. The predetermined input may be predetermined user operation or may be detection of the stylus P1 by the touch sensor 30, for example.

Generally the noise suppression control according to the present disclosure will hardly affect the image quality of the display device 4 except for that flicker can be suppressed. However, possibly the noise suppression control slightly affects the image quality of the display device 4 in some cases because the driving method (specifically, the inversion pattern, the polarity, or the change rate of the video signal Vsig) of each pixel electrode is changed. Regarding this point, according to the present embodiment, in the mode in which the noise suppression control is carried out (first operation mode), the deterioration of the rendering quality can be avoided by suppressing at least frequency components that belong to the frequency bands used for communication between the stylus P1 and the touch sensor 30 in the display noise. On the other hand, in the mode in which the noise suppression control is not carried out (second operation mode), the lowering of the image quality due to execution of the noise suppression control can be completely prevented. That is, it can be said that the first operation mode is an object-detection-prioritized mode in which priority is given to detection of objects such as the stylus P1 and the finger P2, and it can be said that the second operation mode is an image-quality-prioritized mode in which priority is given to the image quality of the display device 4. According to the present embodiment, these object-detection-prioritized mode and image-quality-prioritized mode can be switched according to need.

Although preferred embodiments of the present disclosure are described above, it is obvious that the present disclosure is not limited to these embodiments at all and the present disclosure can be carried out in various modes without departing from the gist thereof.

For example, in the above-described respective embodiments, it is explained that the display device 4 is a liquid crystal display. However, the present disclosure can be favorably applied also to the case in which the display device 4 is another kind of display device.

Figure 28A:
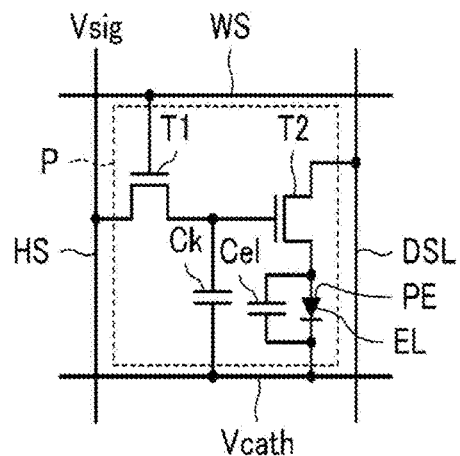
FIG. 28A is a diagram depicting a configuration of a display screen of an organic EL display.

FIG. 28A is a diagram depicting the configuration of a display screen of an organic EL display. As depicted in FIG. 28A, in the display screen of the organic EL display, plural writing scanning lines WS, plural video signal lines HS, at least one power supply line DSL, and at least one ground interconnect Vcath are disposed. Pixels P are disposed at the intersections of the respective writing scanning lines WS and the respective video signal lines HS. The pixel P is configured to include transistors T1 and T2, an organic EL element EL, and holding capacitance Ck. A pixel electrode PE is formed of the anode of the organic EL element EL. Capacitance Cel depicted in FIG. 28A is parasitic capacitance of the organic EL element EL.

The control electrode of the transistor T1 is connected to the writing scanning line WS. One non-control electrode is connected to the video signal line HS and the other non-control electrode is connected to the control electrode of the transistor T2. One non-control electrode of the transistor T2 is connected to the power supply line DSL and the other non-control electrode is connected to the anode of the organic EL element EL. The cathode of the organic EL element EL is connected to the ground interconnect Vcath. The holding capacitance Ck is connected between the control electrode of the transistor T2 and the ground interconnect Vcath.

When the display device 4 is the organic EL display, due to the occurrence of voltage vibration in the ground interconnect Vcath caused by driving of the plural pixel electrodes PE, capacitive noise (display noise) possibly occurs in the sensor electrode SE in the touch panel 3. Against this, the display device 4 can suppress at least frequency components that belong to the frequency bands used for communication between the stylus P1 and the touch sensor 30 in the display noise by carrying out control to select the driving method of each pixel electrode PE according to the contents of image data similarly to the case in which the display device 4 is a liquid crystal display. Therefore, communication operation of the stylus P1 and the touch sensor 30 can be made independent of driving operation of the pixel electrodes PE by the display device 4. Thus, also when the display device 4 is the organic EL display, the deterioration of the quality of rendering processing based on data transmitted by the stylus P1 due to the display noise can be avoided. Furthermore, it also becomes possible to avoid the quality deterioration of the rendering processing based on data transmitted by the stylus P1, such as failure in rendering due to malfunction of the stylus P1.

Figure 28B:
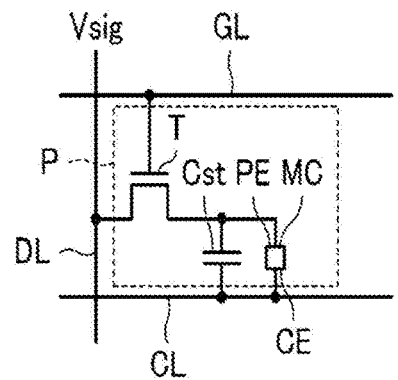
FIG. 28B is a diagram depicting the configuration of a display screen of an electronic paper.

FIG. 28B is a diagram depicting the configuration of a display screen of electronic paper. As depicted in FIG. 28B, in the display screen of an electronic paper, plural scanning lines GL, plural data lines DL, and at least one common potential line CL are disposed. Pixels P are disposed at the intersections of the respective scanning lines GL and the respective data lines DL. The pixel P is configured to include a transistor T, a sealed electrophoretic display ink MC, a pixel electrode PE and a common electrode CE that sandwich the electrophoretic display ink MC, and storage capacitance Cst.

The control electrode of the transistor T is connected to the scanning line GL. One non-control electrode is connected to the data line DL and the other non-control electrode is connected to the pixel electrode PE. The common electrode CE is connected to the common potential line CL. The storage capacitance Cst is connected between the other non-control electrode of the transistor T and the common potential line CL.

When the display device 4 is the electronic paper, due to the occurrence of voltage vibration in the common potential line CL caused by driving of the plural pixel electrodes PE, capacitive noise (display noise) possibly occurs in the sensor electrode SE in the touch panel 3. Against this, the display device 4 can suppress at least frequency components that belong to the frequency bands used for communication between the stylus P1 and the touch sensor 30 in the display noise by carrying out control to select the driving method of each pixel electrode PE according to the contents of image data similarly to the case in which the display device 4 is a liquid crystal display or organic EL display. Therefore, communication operation of the stylus P1 and the touch sensor 30 can be made independent of driving operation of the pixel electrodes PE by the display device 4. Thus, also when the display device 4 is the electronic paper, the deterioration of the quality of rendering processing based on data transmitted by the stylus P1 due to the display noise can be avoided. Furthermore, it also becomes possible to avoid the quality deterioration of the rendering processing based on data transmitted by the stylus P1, such as failure in rendering due to malfunction of the stylus P1.

Moreover, in the position detection systems 1 according to the above-described respective embodiments, the varying potential difference and the lighting quantity difference are calculated regarding a certain driving method and the driving method of each pixel electrode PE is selected based on threshold determination of the result thereof. However, the varying potential difference and the lighting quantity difference may be calculated in advance based on each of conceivable plural driving methods and the driving method with which the values of them become the smallest may be selected.

Furthermore, in the position detection systems 1 according to the above-described respective embodiments, only one of the inversion pattern, the polarity, and the change rate of the video signal is deemed as the target of selection. However, two or more may be deemed as the target of selection. In this case, it is preferable to calculate the varying potential difference and the lighting quantity difference in advance based on each of a plurality of arbitrary combinations of physical quantities deemed as the selection target and select the combination with which the values of them become the smallest.

Moreover, the specific configuration of the display device that can be used in the position detection system according to the present disclosure is not limited to the configuration of the display device 4 explained in the above-described respective embodiments. For example, it is possible to use, in the position detection system according to the present disclosure, another kind of display device such as a display device for mobile use in which a system drive IC including timing control circuit, common potential control circuit, another power generating circuit, and so forth is mounted on a glass surface of a display device.

It is to be noted that the embodiment of the present disclosure is not limited to the foregoing embodiments, and that various changes can be made without departing from the spirit of the present disclosure.

What is claimed is:

1. A position detection system that carries out position detection of an active pen, the position detection system comprising:
   a display device that displays image data by driving each of a plurality of pixel electrodes, wherein the display device has at least one common electrode; and
   a touch panel including a sensor electrode and a touch sensor, wherein:
      the active pen, in operation, communicates with the touch sensor using a frequency included in a predetermined frequency band by a charge induced in the sensor electrode, the display device, in operation, reduces display noise in the predetermined frequency band including the frequency used by the active pen to communicate with the touch sensor by changing a driving method of the plurality of pixel electrodes or the at least one common electrode, the active pen and the touch sensor communicate by detecting or sending out a signal with a predetermined frequency included in the predetermined frequency band, the active pen sends out a data signal by modulating a carrier wave having the predetermined frequency with predetermined data, and the touch sensor acquires the predetermined data by demodulating the data signal.

2. The position detection system according to claim 1, wherein:

the sensor electrode is an electrode different from both the plurality of pixel electrodes and the at least one common electrode.

3. The position detection system according to claim 1, wherein:

the sensor electrode includes a plurality of first electrodes and a plurality of second electrodes, the plurality of first electrodes and the at least one common electrode are configured by a same physical interconnect or physical electrode pattern, and the plurality of second electrodes is different from the plurality of first electrodes, the plurality of pixel electrodes, and the at least one common electrode.

4. The position detection system according to claim 1, wherein:

the display device controls noise suppression according to contents of the image data.

5. The position detection system according to claim 4, wherein:

the display device selects the driving method of the plurality of pixel electrodes according to the contents of the image data and a polarity of each of the plurality of pixel electrodes.

6. The position detection system according to claim 5, wherein:

the display device selects the driving method in units of gate lines.

7. The position detection system according to claim 1, wherein:

the touch sensor detects the active pen asynchronously with driving of the plurality of pixel electrodes by the display device.

8. The position detection system according to claim 1, wherein:

the display device selectively operates in either of a first operation mode in which driving of the plurality of pixel electrodes suppresses the at least one frequency component included in the predetermined frequency band in the capacitive noise that occurs in the sensor electrode and a second operation mode in which driving of the plurality of pixel electrodes does not suppress the at least one frequency component included in the predetermined frequency band in the capacitive noise that occurs in the sensor electrode, and the capacitive noise in the first operation mode is suppressed compared with the capacitive noise in the second operation mode.

9. The position detection system according to claim 8, wherein:

the second operation mode is a mode in which image quality of the display device is prioritized over accuracy of detection of the active pen by the touch sensor, and the first operation mode is a mode in which accuracy of detection of the active pen by the touch sensor is prioritized over image quality of the display device.

10. The position detection system according to claim 8, wherein:

the display device switches between the first and second operation modes in response to a predetermined input.

11. The position detection system according to claim 10, wherein:

the predetermined input is a predetermined user operation.

12. The position detection system according to claim 10, wherein:

the predetermined input is a detection of the active pen by the touch sensor.

13. The position detection system according to claim 1, wherein the display device includes:

a display screen including gate lines in N rows and source lines in M columns, a gate driver group connected to the gate lines in the N rows, a source driver group connected to the source lines in the M columns, and a timing control circuit connected to the gate driver group and the source driver group, wherein the timing control circuit controls the driving method of the plurality of pixel electrodes at a time of driving of the gate lines driven at an n-th timing based on a display pattern displayed by the gate lines driven at an (n−1)-th timing in the gate lines in the N rows, respective polarities used at a time of driving of the gate lines driven at the (n−1)-th timing, and a display pattern displayed by the gate lines driven at the n-th timing in the gate lines on the N rows.

14. The position detection system according to claim 13, wherein:

the timing control circuit controls a pattern of the driving method of the plurality of pixel electrodes at the time of driving of the gate lines driven at the n-th timing such that a varying potential difference is decreased, and the varying potential difference is a total of an amount of transitions of a potential of each of the source lines in the M columns in a plus direction and a total of an amount of transitions of the potential of each of the source lines in the M columns in a minus direction.

15. The position detection system according to claim 13, wherein:

the source driver group includes a plurality of source groups corresponding to a plurality of the source lines different from each other, and the timing control circuit controls, in units of the source groups, a polarity of a pattern of the driving method of the plurality of pixel electrodes at the time of driving of the gate lines driven at the n-th timing.

16. The position detection system according to claim 14, wherein:

the timing control circuit controls the driving method of the plurality of pixel electrodes at the time of driving of the gate lines driven at the n-th timing such that a lighting quantity difference is decreased, and the lighting quantity difference is a difference between a number of pixels that are in a bright state due to plus-side driving by which a potential of the pixel electrodes is changed between an intermediate potential and a high-side power supply potential and a number of pixels that are in a bright state due to minus-side driving by which the potential of the pixel electrodes is changed between the intermediate potential and a low-side power supply potential.

17. A position detection system that carries out position detection of an active pen, the position detection system comprising:
    a display device that displays image data by driving each of a plurality of pixel electrodes, wherein the display device has at least one common electrode; and
    a touch panel including a sensor electrode and a touch sensor, wherein:
        the active pen, in operation, communicates with the touch sensor using a frequency included in a predetermined frequency band by a charge induced in the sensor electrode,
        the display device, in operation, reduces display noise in the predetermined frequency band including the frequency used by the active pen to communicate with the touch sensor by changing a driving method of the plurality of pixel electrodes or the at least one common electrode,
        the active pen and the touch sensor communicate by detecting or sending out a signal with a predetermined frequency included in the predetermined frequency band, and
        the display device controls noise suppression according to contents of the image data.

18. The position detection system according to claim 17, wherein:
    the display device selects the driving method of the plurality of pixel electrodes according to the contents of the image data and a polarity of each of the plurality of pixel electrodes.

19. The position detection system according to claim 18, wherein:
    the display device selects the driving method in units of gate lines.

20. A position detection system that carries out position detection of an active pen, the position detection system comprising:
    a display device that displays image data by driving each of a plurality of pixel electrodes, wherein the display device has at least one common electrode; and
    a touch panel including a sensor electrode and a touch sensor, wherein:
        the active pen, in operation, communicates with the touch sensor using a frequency included in a predetermined frequency band by a charge induced in the sensor electrode,
        the display device, in operation, reduces display noise in the predetermined frequency band including the frequency used by the active pen to communicate with the touch sensor by changing a driving method of the plurality of pixel electrodes or the at least one common electrode,
        the active pen and the touch sensor communicate by detecting or sending out a signal with a predetermined frequency included in the predetermined frequency band,
        the display device selectively operates in either of a first operation mode in which driving of the plurality of pixel electrodes suppresses the at least one frequency component included in the predetermined frequency band in the capacitive noise that occurs in the sensor electrode and a second operation mode in which driving of the plurality of pixel electrodes does not suppress the at least one frequency component included in the predetermined frequency band in the capacitive noise that occurs in the sensor electrode, and
        the capacitive noise in the first operation mode is suppressed compared with the capacitive noise in the second operation mode.

21. The position detection system according to claim 20, wherein:
    the second operation mode is a mode in which image quality of the display device is prioritized over accuracy of detection of the active pen by the touch sensor, and
    the first operation mode is a mode in which accuracy of detection of the active pen by the touch sensor is prioritized over image quality of the display device.

22. The position detection system according to claim 20, wherein:
    the display device switches between the first and second operation modes in response to a predetermined input.

23. The position detection system according to claim 22, wherein:
    the predetermined input is a predetermined user operation.

24. The position detection system according to claim 22, wherein:
    the predetermined input is a detection of the active pen by the touch sensor.

* * * * *